United States Patent
Nakata et al.

(10) Patent No.: US 7,408,603 B2
(45) Date of Patent: Aug. 5, 2008

(54) LIQUID CRYSTAL PANEL AND LIQUID CRYSTAL DISPLAY APPARATUS

(75) Inventors: Mie Nakata, Osaka (JP); Shuuji Yano, Osaka (JP); Naoki Koishi, Osaka (JP); Kentarou Kobayashi, Osaka (JP)

(73) Assignee: Nitto Denko Corporation, Osaka (JP)

(*) Notice: Subject to any disclaimer, the term of this patent is extended or adjusted under 35 U.S.C. 154(b) by 318 days.

(21) Appl. No.: 11/292,351

(22) Filed: Dec. 2, 2005

(65) Prior Publication Data

US 2006/0119775 A1 Jun. 8, 2006

(30) Foreign Application Priority Data

Dec. 8, 2004 (JP) ............................. 2004-355590
Aug. 23, 2005 (JP) ............................. 2005-240588

(51) Int. Cl.
G02F 1/1333 (2006.01)
G02F 1/1335 (2006.01)

(52) U.S. Cl. .................. 349/119; 349/84; 349/96; 349/117; 349/122

(58) Field of Classification Search ............... 349/119, 349/84, 96, 117, 122
See application file for complete search history.

(56) References Cited

U.S. PATENT DOCUMENTS

| | | | |
|---|---|---|---|
| 5,489,917 A | 2/1996 | Ikezaki et al. | |
| 6,115,095 A | 9/2000 | Suzuki et al. | |
| 6,175,400 B1 | 1/2001 | Duncan et al. | |
| 6,468,609 B2 | 10/2002 | Marien et al. | |
| 6,646,701 B2 | 11/2003 | Lyu et al. | |
| 6,788,374 B2 | 9/2004 | Ko et al. | |
| 2002/0024627 A1 | 2/2002 | Sakamoto et al. | |
| 2003/0193635 A1 | 10/2003 | Mi et al. | |
| 2004/0051831 A1 | 3/2004 | Yu et al. | |
| 2004/0051832 A1 | 3/2004 | Shimoshikiryoh | |
| 2004/0125291 A1 | 7/2004 | Kawahara et al. | |
| 2004/0125451 A1 | 7/2004 | Miyatake | |
| 2005/0068480 A1 | 3/2005 | Hiyama et al. | |

(Continued)

FOREIGN PATENT DOCUMENTS

JP 11-133408 5/1999

(Continued)

OTHER PUBLICATIONS

Japanese Office Action mailed Nov. 21, 2006, issued in corresponding Japanese Application No. 2005-240588.

(Continued)

*Primary Examiner*—Frank G Font
*Assistant Examiner*—Jerry Blevins
(74) *Attorney, Agent, or Firm*—Westerman, Hattori, Daniels & Adrian, LLP.

(57) ABSTRACT

A liquid crystal panel according to an embodiment of the present invention includes: a liquid crystal cell; a first polarizer arranged on one side of the liquid crystal cell; a second polarizer arranged on another side of the liquid crystal cell; a positive A plate and a positive C plate arranged between the liquid crystal cell and the first polarizer; and an isotropic optical element arranged between the liquid crystal cell and the second polarizer, wherein the positive A plate is arranged between the first polarizer and the positive C plate.

19 Claims, 3 Drawing Sheets

U.S. PATENT DOCUMENTS

| | | |
|---|---|---|
| 2005/0140900 A1* | 6/2005 | Jeon et al. .................. 349/141 |
| 2005/0195479 A1 | 9/2005 | Ishizaki et al. |
| 2005/0200792 A1 | 9/2005 | Jeon et al. |
| 2005/0206817 A1 | 9/2005 | Kajita et al. |
| 2006/0077548 A1 | 4/2006 | Li et al. |

FOREIGN PATENT DOCUMENTS

| | | |
|---|---|---|
| JP | 2000-066196 | 3/2000 |
| JP | 2002-072215 | 3/2002 |
| JP | 2004-325468 | 11/2004 |
| JP | 2005-128498 A | 5/2005 |
| JP | 2005-165239 A | 6/2005 |
| JP | 2005-208356 A | 8/2005 |
| JP | 2005-265889 A | 9/2005 |
| JP | 2005-321528 A | 11/2005 |
| WO | WO 2004/090024 A1 | 10/2004 |
| WO | WO 2004/090627 A1 | 10/2004 |

OTHER PUBLICATIONS

Japanese Office Action dated Nov. 21, 2006, Application No. 515268.
Taiwan Office Action dated Dec. 19, 2006, Application No. 094137607.
Japanese translation of Taiwan Office Action.

* cited by examiner

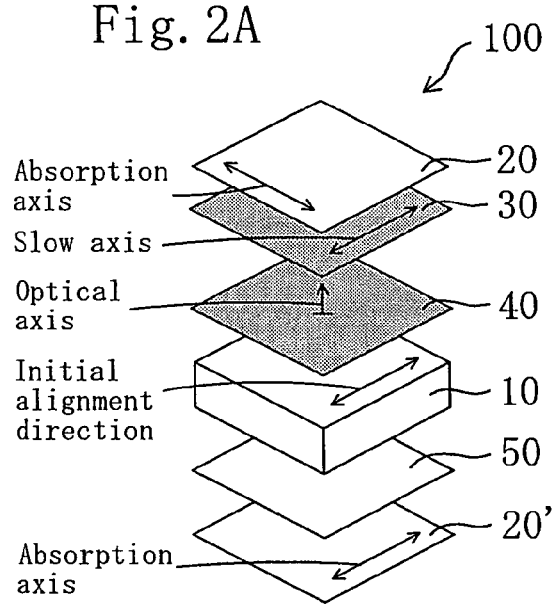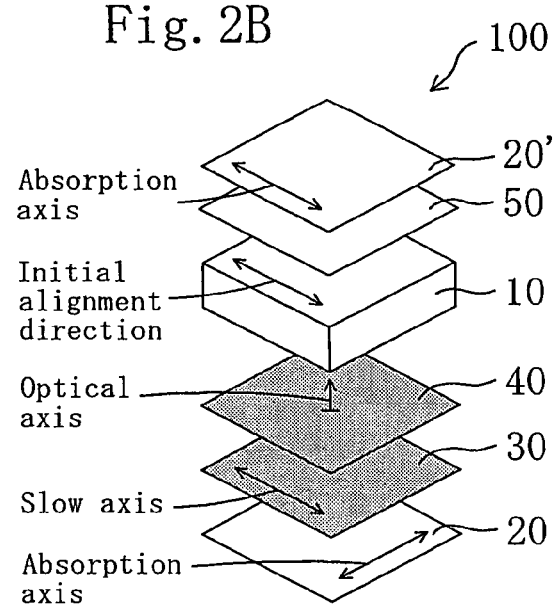

LIQUID CRYSTAL PANEL AND LIQUID CRYSTAL DISPLAY APPARATUS

This application claims priority under 35 U.S.C. Section 119 to Japanese Patent Application No. 2004-355590 filed on Dec. 8, 2004 and Japanese Patent Application No. 2005-240588 filed on Aug. 23, 2005, which are herein incorporated by reference.

FIELD OF THE INVENTION

The present invention relates to a liquid crystal panel having a liquid crystal cell, a polarizer, and an optical element. Further, the present invention relates to a liquid crystal television and a liquid crystal display apparatus both using the liquid crystal panel.

DESCRIPTION OF THE RELATED ART

A liquid crystal display apparatus provided with a liquid crystal cell of in-plane switching (IPS) mode involves control of light transmittance (white display) and light shielding (black display) through applying an electric field in a horizontal direction on liquid crystal molecules aligned in a substantially horizontal direction without application of the electric field to rotate the liquid crystal molecules by about 45°. A conventional liquid crystal display apparatus provided with a liquid crystal cell of IPS mode has problems in that: a contrast ratio is reduced when a screen is viewed from an oblique direction at an angle of 45° (azimuth angle of 45°, 135°, 225°, or 315°) with respect to an absorption axis of a polarizing plate; and a display color varying phenomenon (also referred to as color shift) increases depending on an angle the screen is viewed. Thus, there is disclosed a method of improving a color shift by arranging a plurality of retardation films on one side of a liquid crystal cell (see JP 11-133408, for example). However, such a technique improves the color shift, but does not sufficiently improve the contrast ratio in an oblique direction.

SUMMARY OF THE INVENTION

A liquid crystal panel according to an embodiment of the present invention includes: a liquid crystal cell; a first polarizer arranged on one side of the liquid crystal cell; a second polarizer arranged on another side of the liquid crystal cell; a positive A plate and a positive C plate arranged between the liquid crystal cell and the first polarizer; and an isotropic optical element arranged between the liquid crystal cell and the second polarizer. Here, the positive A plate is arranged between the first polarizer and the positive C plate.

In one embodiment of the invention, the liquid crystal cell includes a liquid crystal layer containing homogeneously aligned liquid crystal molecules in the absence of an electric field.

In another embodiment of the invention, the liquid crystal layer has a refractive index profile of nx>ny=nz.

In still another embodiment of the invention, the liquid crystal cell includes one of IPS mode, FFS mode, and FLC mode.

In still another embodiment of the invention, an initial alignment direction of the liquid crystal cell is substantially parallel to a direction of an absorption axis of the second polarizer.

In still another embodiment of the invention, the initial alignment direction of the liquid crystal cell is substantially parallel to a direction of an absorption axis of the polarizer arranged on a backlight side of the liquid crystal cell. Alternatively, the initial alignment direction of the liquid crystal cell is substantially perpendicular to a direction of an absorption axis of the polarizer arranged on a backlight side of the liquid crystal cell.

In still another embodiment of the invention, a slow axis of the positive A plate is substantially perpendicular to an absorption axis of the first polarizer.

In still another embodiment of the invention, the positive A plate has an in-plane retardation value (Re[590]) of 70 to 200 nm determined by using light of a wavelength of 590 nm at 23° C.

In still another embodiment of the invention, the positive A plate has an absolute value of difference between Re[590] and Rth[590], that is, |Rth[590]−Re[590]| of 0 to 5 nm.

In still another embodiment of the invention, the positive A plate has Re[480]/Re[590] of 0.8 to 1.2.

In still another embodiment of the invention, the positive A plate includes a stretched film of a polymer film containing one of polynorbornene and polycarbonate as a main component.

Instill another embodiment of the invention, the polymer film has an absolute value of photoelastic coefficient C[590] (m$^2$/N) of $2.0 \times 10^{-13}$ to $1.0 \times 10^{-10}$.

In still another embodiment of the invention, the positive C plate has a thickness direction retardation value (Rth[590]) of −200 to −30 nm determined by using light of a wavelength of 590 nm at 23° C.

In still another embodiment of the invention, the positive C plate has Re[590] of 0 to 5 nm.

In still another embodiment of the invention, the positive C plate includes one of a hardened layer and a cured layer of a homeotropically aligned liquid crystalline composition.

In still another embodiment of the invention, the isotropic optical element includes a polymer film containing as a main component at least one resin selected from the group consisting of polynorbornene, a cellulose ester, an isobutylene/N-methylmaleimide copolymer, and an acrylonitrile/styrene copolymer.

In still another embodiment of the invention, the polymer film has an absolute value of photoelastic coefficient C[590] (m$^2$/N) of $2.0 \times 10^{-13}$ to $1.0 \times 10^{-10}$.

According to another aspect of the invention, a liquid crystal television is provided. The liquid crystal television includes the above-described liquid crystal panel.

According to another aspect of the invention, a liquid crystal display apparatus is provided. The liquid crystal display apparatus includes the above-described liquid crystal panel.

In the liquid crystal panel of the present invention, the positive A plate and the positive C plate are arranged between the liquid crystal cell and the first polarizer arranged on one side of the liquid crystal cell. Further, the positive A plate is arranged between the first polarizer and the positive C plate, and the isotropic optical element is arranged between the liquid crystal cell and the second polarizer arranged on another side of the liquid crystal cell, to thereby increase a contrast ratio in an oblique direction and reduce a color shift in an oblique direction of the liquid crystal display apparatus.

BRIEF DESCRIPTION OF THE DRAWINGS

In the accompanying drawings:

FIG. 2A is a schematic perspective view of the liquid crystal panel of the present invention employing O-mode, and FIG. 2B is a schematic perspective view of the liquid crystal panel of the present invention employing E-mode.

DESCRIPTION OF THE PREFERRED EMBODIMENTS

A. Outline of Entire Liquid Crystal Panel

Figure 1:
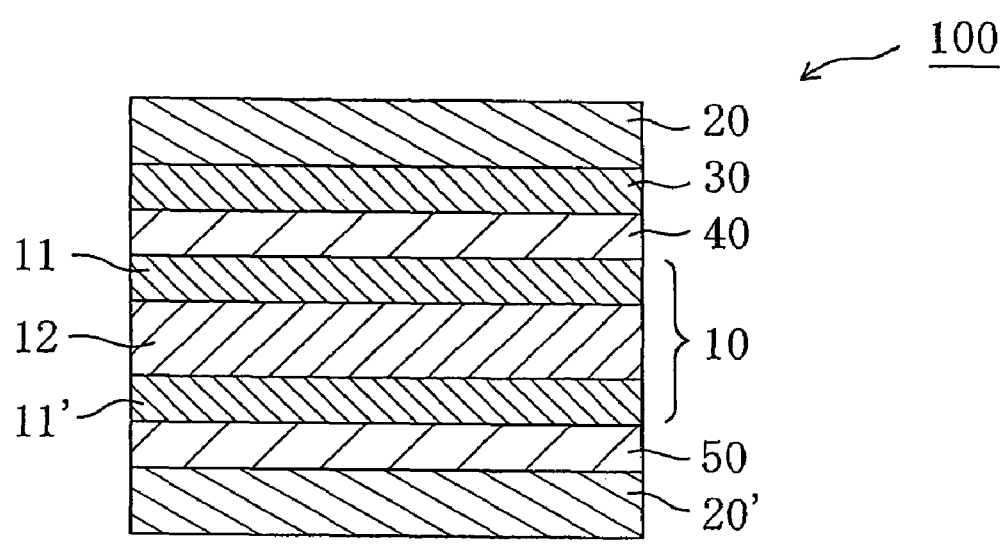
FIG. 1 is a schematic sectional view of a liquid crystal panel according to a preferred embodiment of the present invention.

FIG. 1 is a schematic sectional view of a liquid crystal panel according to a preferred embodiment of the present invention. FIG. 2A is a schematic perspective view of the liquid crystal panel employing O-mode, and FIG. 2B is a schematic perspective view of the liquid crystal panel employing E-mode. Note that, a ratio among length, width, and thickness of each member in FIGS. 1, 2A, and 2B is different from that of an actual member for clarity. In a case where a liquid crystal panel employs O-mode (FIG. 2A), for example, a liquid panel 100 is provided with: a liquid crystal cell 10; a first polarizer 20 arranged on one side (viewer side in FIG. 2A) of the liquid crystal cell 10; a second polarizer 20' arranged on another side (backlight side in FIG. 2A) of the liquid crystal cell 10; a positive A plate 30 and a positive C plate 40 arranged between the first polarizer 20 and the liquid crystal cell 10; and an isotropic optical element 50 arranged between the second polarizer 20' and the liquid crystal cell 10. The positive A plate 30 is arranged between the first polarizer 20 and the positive C plate 40 such that a slow axis of the positive A plate 30 and an absorption axis of the first polarizer 20 are perpendicular to each other. The positive C plate 40 is arranged between the positive A plate 30 and the liquid crystal cell 10. The polarizers 20 and 20' are arranged such that respective absorption axes are perpendicular to each other. In practical use, any appropriate protective layers (not shown) may be arranged on outer sides of the polarizers 20 and 20'. In another embodiment of the present invention, other members (preferably an isotropic optical element) may be arranged between the members shown in FIG. 1.

The second polarizer 20' (that is, the polarizer on a side having the isotropic optical element 50 arranged) is preferably arranged such that its absorption axis is substantially parallel to an initial alignment direction of the liquid crystal cell 10. The first polarizer 20 is arranged such that its absorption axis is substantially perpendicular to the initial alignment direction of the liquid crystal cell 10.

The liquid crystal panel of the present invention may be of so-called O-mode or so-called E-mode. The term "liquid crystal panel of O-mode" refers to a liquid crystal panel in which an absorption axis of a polarizer arranged on a backlight side of a liquid crystal cell and an initial alignment direction of the liquid crystal cell are parallel to each other. The term "liquid crystal panel of E-mode" refers to a liquid crystal panel in which an absorption axis of a polarizer arranged on a backlight side of a liquid crystal and an initial alignment direction of the liquid crystal cell are perpendicular to each other. In the liquid crystal panel of O-mode as shown in FIG. 2A, the first polarizer 20, the positive A plate 30, and the positive C plate 40 are preferably arranged on a viewer side of the liquid crystal cell 10, and the isotropic optical element 50 and the second polarizer 20' are preferably arranged on a backlight side of the liquid crystal cell 10. In the liquid crystal panel of E-mode as shown in FIG. 2B, the first polarizer 20, the positive A plate 30, and the positive C plate 40 are preferably arranged on a backlight side of the liquid crystal cell 10, and the isotropic optical element 50 and the second polarizer 20' are preferably arranged on a viewer side of the liquid crystal cell 10. In the present invention, a liquid crystal panel of O-mode as shown in FIG. 2A is preferred because an arrangement of O-mode can realize better optical compensation. To be specific, in the arrangement of O-mode, the positive A plate and the positive C plate are arranged on a far side from backlight and thus hardly receive adverse effects due to heat of backlight, to thereby reduce shift or unevenness in retardation values.

B. Liquid Crystal Cell

Referring to FIG. 1, the liquid crystal cell 10 used in the liquid crystal panel of the present invention is provided with: a pair of substrates 11 and 11'; and a liquid crystal layer 12 as a display medium held between the substrates 11 and 11'. One substrate (color filter substrate) 11 is provided with color filters and black matrix (both not shown). The other substrate (active matrix substrate) 11' is provided with: a switching element (typically TFT, not shown) for controlling electrooptic properties of liquid crystals; a scanning line (not shown) for providing a gate signal to the switching element and a signal line (not shown) for providing a source signal thereto; and a pixel electrode and a counter electrode (both not shown). The color filters may be provided in the active matrix substrate 11' as well. A distance (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

The liquid crystal layer 12 preferably contains homogeneously aligned liquid crystal molecules in the absence of an electric field. The liquid crystal layer (eventually, the liquid crystal cell) generally exhibits a refractive index profile of $nx > ny = nz$ (where, $nx$, $ny$, and $nz$ respectively represent refractive indices in the slow axis direction, fast axis direction, and thickness direction of the liquid crystal layer). In the specification of the present invention, $ny = nz$ includes not only a case where $ny$ and $nz$ are exactly equal, but also a case where $ny$ and $nz$ are substantially equal. Further, the phrase "initial alignment direction of the liquid crystal cell" refers to a direction providing a maximum in-plane refractive index of the liquid crystal layer by alignment of the liquid crystal molecules in the liquid crystal layer in the absence of an electric field. Typical examples of drive mode using the liquid crystal layer exhibiting such refractive index profile include: in-plane switching (IPS) mode; fringe field switching (FFS) mode; and ferroelectric liquid crystal (FLC) mode. Specific examples of liquid crystals used for those drive modes include nematic liquid crystals and smectic liquid crystals. For example, the nematic liquid crystals are used for the IPS mode and the FFS mode, and the smectic liquid crystals are used for the FLC mode.

In the IPS mode, homogeneously aligned liquid crystal molecules in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), normally black mode provides completely black display in the absence of an electric field by: adjusting an alignment direction of the liquid crystal cell without application of an electric field, in a direction of an absorption axis of one polarizer; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle. The IPS mode includes super in-plane switching (S-IPS) mode and advanced super in-plane switching (AS-IPS) mode each employing a V-shaped electrode, a zigzag electrode, or the like. Examples of a commercially available liquid crystal display apparatus of IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

In the FFS mode, homogeneously aligned liquid crystal molecules in the absence of an electric field respond in an electric field parallel to substrates (also referred to as a horizontal electric field) generated between a counter electrode and a pixel electrode each formed of transparent conductor, for example, by utilizing an electrically controlled birefringence (ECB) effect. The horizontal electric field in the FFS mode is referred to as a fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, normally black mode provides completely black display in the absence of an electric field by: adjusting an alignment direction of the liquid crystal cell without application of an electric field, in a direction of an absorption axis of one polarizer; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle. The FFS mode includes advanced fringe field switching (A-FFS) mode and ultra fringe field switching (U-FFS) mode each employing a V-shaped electrode, a zigzag electrode, or the like. An example of a commercially available liquid crystal display apparatus of FFS mode includes Tablet PC "M1400" (trade name, manufactured by Motion Computing, Inc.).

The FLC mode utilizes property of ferromagnetic chiral smectic liquid crystals encapsulated between electrode substrates each having a thickness of about 1 to 2 µm to exhibit two stable states of molecular alignment, for example. To be specific, the ferroelectric chiral smectic liquid crystal molecules rotate within a plane parallel to the substrates and respond due to application of a voltage. The FLC mode can provide black and white displays based on the same principle as that of the IPS mode or the FFS mode. The FLC mode has such a feature in that a response speed is high compared with those in other drive modes. In the specification of the present invention, the FLC mode includes: surface stabilized ferroelectric liquid crystal (SS-FLC) mode; antiferroelectric liquid crystal (AFLC) mode; polymer stabilized ferroelectric liquid crystal (PS-FLC) mode; and V-shaped switching ferroelectric liquid crystal (V-FLC) mode.

The homogeneously aligned liquid crystal molecules are obtained as a result of interaction between substrates subjected to alignment treatment and liquid crystal molecules, in which alignment vectors of the liquid crystal molecules are parallel to a substrate plane and uniformly aligned. In the specification of the present invention, homogenous alignment includes a case where the alignment vectors are slightly inclined with respect to the substrate plane, that is, a case where the liquid crystal molecules are pretilted. In a case where the liquid crystal molecules are pretilted, a pretilt angle is preferably 20° or less for maintaining a large contrast ratio and obtaining favorable display properties.

Any appropriate nematic liquid crystals may be employed as the nematic liquid crystals depending on the purpose. For example, the nematic liquid crystals may have positive dielectric anisotropy or negative dielectric anisotropy. A specific example of the nematic liquid crystals having positive dielectric anisotropy includes "ZLI-4535" (trade name, available from Merck Ltd., Japan). A specific example of the nematic liquid crystals having negative dielectric anisotropy includes "ZLI-2806" (trade name, available from Merck Ltd., Japan). A difference between an ordinary index (no) and an extraordinary index (ne), that is, a birefringence ($\Delta n_{LC}$) can be appropriately selected in accordance with the response speed, transmittance, and the like of the liquid crystals. However, the birefringence is preferably 0.05 to 0.30, in general.

Any appropriate smectic liquid crystals may be employed as the smectic liquid crystals depending on the purpose. The smectic liquid crystals to be used preferably have an asymmetric carbon atom in a part of a molecular structure and exhibit ferroelectric property (also referred to as ferroelectric liquid crystals) Specific examples of the smectic liquid crystals exhibiting ferroelectric property include: p-decyloxybenzylidene-p'-amino-2-methylbutylcinnamate; p-hexyloxybenzylidene-p'-amino-2-chloropropylcinnamate; and 4-o-(2-methyl)butylresorcylidene-4'-octylaniline. Examples of commercially available ferroelectric liquid crystals include: ZLI-5014-000 (trade name, capacitance of 2.88 nF, spontaneous polarization of $-2.8$ $C/cm^2$, available from Merck Ltd., Japan); ZLI-5014-100 (trade name, capacitance of 3.19 nF, spontaneous polarization of $-20.0$ $C/cm^2$, available from Merck Ltd., Japan); and FELIX-008 (trade name, capacitance of 2.26 nF, spontaneous polarization of $-9.6$ $C/cm^2$, available from Hoechst Aktiengesellschaft).

Any appropriate cell gap may be employed as the cell gap (distance between substrates) of the liquid crystal cell depending on the purpose. However, the cell gap is preferably 1.0 to 7.0 µm. A cell gap within the above range can reduce response time and provide favorable display properties.

C. Polarizer

In the specification of the present invention, the term "polarizer" refers to a film capable of converting natural light or polarized light into appropriate polarized light. Any appropriate polarizer may be employed as a polarizer used in the present invention. Preferably, a polarizer capable of converting natural light or polarized light into linearly polarized light is used.

The polarizer may have any appropriate thickness. The thickness of the polarizer is typically 5 to 80 µm, preferably 10 to 50 µm, and more preferably 20 to 40 µm. A thickness of the polarizer within the above ranges can provide excellent optical properties and mechanical strength.

A light transmittance (also referred to as single axis transmittance) of the polarizer is preferably 41% or more, and more preferably 43% or more measured by using light of a wavelength of 440 nm at 23° C. A theoretical upper limit of the single axis transmittance is 50%. A degree of polarization is preferably 99.8 to 100%, and more preferably 99.9 to 100%. A single axis transmittance and a degree of polarization within the above ranges can further increase a contrast ratio in a normal direction of a liquid crystal display apparatus employing the polarizer.

The single axis transmittance and the degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation. Degree of polarization (%)= $\{(H_0-H_{90})/(H_0+H_{90})\}^{1/2} \times 100$. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

Any appropriate polarizer may be employed as the polarizer used in the present invention depending on the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of its high polarized dichromaticity.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

In addition to the above-described polarizer, further examples of the polarizer to be used in the present invention include: a polarizer prepared by stretching a polymer film containing a dichromatic substance such as iodine or a dichromatic dye; an O-type polarizer of guest/host-type prepared by aligning in a specific direction a liquid crystalline composition containing a dichromatic substance and a liquid crystalline compound (U.S. Pat. No. 5,523,863); and an E-type polarizer prepared by aligning lyotropic liquid crystals in a specific direction (U.S. Pat. No. 6,049,428).

In the liquid crystal panel of the present invention, the polarizers arranged on both sides of the liquid crystal cell may be identical to or different from each other.

Referring to FIGS. 2A and 2B, any appropriate method may be employed as a method of arranging the first polarizer 20 and the second polarizer 20' depending on the purpose. Preferably, the first polarizer 20 and the second polarizer 20' are each provided with an adhesive layer or a pressure sensitive adhesive layer (not shown) on a surface opposing the liquid crystal cell. Then, the first polarizer 20 is bonded to a surface of the positive A plate 30, and the second polarizer 20' is bonded to a surface of the isotropic optical element 50. In this way, contrast of a liquid crystal display apparatus employing the polarizers can be increased.

A thickness of the adhesive layer or pressure sensitive adhesive layer may be appropriately determined in accordance with intended use, adhesive strength, and the like. The adhesive layer has a thickness of generally 0.1 to 50 μm, preferably 0.1 to 20 μm, and particularly preferably 0.1 to 10 μm. The pressure sensitive adhesive layer has a thickness of generally 1 to 100 μm, preferably 5 to 80 μm, and particularly preferably 10 to 50 μm.

Any appropriate adhesive or pressure sensitive adhesive may be employed for forming the adhesive layer or pressure sensitive adhesive layer in accordance with the kind of adherend. In particular, in a case where a polyvinyl alcohol-based film is used for the polarizer, an aqueous adhesive is preferably used as the adhesive. An adhesive containing a polyvinyl alcohol-based resin as a main component is more preferably used. A specific example thereof includes an adhesive "GOHSEFIMER Z200" (trade name, available from Nippon Synthetic Chemical Industry Co., Ltd.) containing as a main component modified polyvinyl alcohol having an acetoacetyl group. An acrylic pressure sensitive adhesive containing an acrylic polymer as a base polymer is preferably used as the pressure sensitive adhesive from viewpoints of excellent optical transparency, appropriate pressure sensitive adhesive properties such as wetting property, agglomeration property, and adhesiveness, and excellent weatherability and thermal resistance. A specific example thereof includes a double-face optical tape "SK-2057" (trade name, available from Soken Chemical & Engineering Co., Ltd.) containing an acrylic pressure sensitive adhesive as a pressure sensitive adhesive layer.

The first polarizer 20 is preferably arranged such that its absorption axis is substantially perpendicular to an absorption axis of the opposing second polarizer 20'. In the specification of the present invention, the phrase "substantially perpendicular" includes a case where the absorption axis of the first polarizer 20 and the absorption axis of the second polarizer 20' form an angle of 90°±2.0°, preferably 90°±1.0°, and more preferably 90°±0.5°. An angle greatly departing from the above ranges tends to cause reduction in contrast of a liquid crystal display apparatus employing the first polarizer 20 and the second polarizer 20'.

D. Positive A Plate

In the specification of the present invention, the term "positive A plate" refers to a positive uniaxial optical element satisfying a refractive index profile of nx>ny=nz (where, nx and ny respectively represent main in-plane refractive indices in a slow axis direction and a fast axis direction, and nz represents a thickness direction refractive index). Note that, in the specification of the present invention, ny=nz includes not only a case where ny and nz are exactly equal, but also a case where ny and nz are substantially equal. The phrase "case where ny and nz are substantially equal" as used herein includes a case where an absolute value of difference between an in-plane retardation value (Re[590]) and a thickness direction retardation value (Rth[590]), that is, |Rth[590]−Re[590]| is 10 nm or less. Re[590] and Rth[590] will be described below.

By referring to FIGS. 1, 2A, and 2B, the positive A plate 30 is arranged between the first polarizer 20 and the positive C plate 40.

D-1. Optical Properties of Positive A Plate

In the specification of the present invention, Re[590] refers to an in-plane retardation value determined by using light of a wavelength of 590 nm at 23° C. Re[590] can be determined from an equation Re[590]=(nx−ny)×d (where, nx and ny respectively represent refractive indices of an optical element (or a retardation film) in a slow axis direction and a fast axis direction at a wavelength of 590 nm, and d (nm) represents a thickness of the optical element (or the retardation film)). Note that the slow axis refers to a direction providing a maximum in-plane refractive index.

The positive A plate used in the present invention has Re[590] of preferably 70 to 200 nm, more preferably 100 to 180 nm, particularly preferably 120 to 170 nm, and most preferably 130 to 150 nm. Re[590] within the above ranges can increase a contrast ratio in an oblique direction of the liquid crystal display apparatus.

In the specification of the present invention, Rth[590] refers to a thickness direction retardation value determined by using light of a wavelength of 590 nm at 23° C. Rth[590] can be determined from an equation Rth[590]=(nx−nz)×d (where, nx and nz respectively represent refractive indices of an optical element (or a retardation film) in a slow axis direction and a thickness direction at a wavelength of 590 nm, and d (nm) represents a thickness of the optical element (or the retardation film)). Note that the slow axis refers to a direction providing a maximum in-plane refractive index.

The positive A plate used in the present invention has an absolute value of difference between Re[590] and Rth[590], that is, |Rth[590]−Re[590]| of preferably 0 to 5 nm, and more preferably 0 to 2 nm. |Rth[590]−Re[590]| within the above ranges can increase a contrast ratio in an oblique direction of the liquid crystal display apparatus.

Re[590] and Rth[590] may be determined by using "KOBRA-21ADH" (trade name, manufactured by Oji Scientific Instruments). Refractive indices nx, ny, and nz can be determined by: using an in-plane retardation value (Re) determined at a wavelength of 590 nm at 23° C., a retardation value (R40) determined by inclining a slow axis by 40° as a tilt angle, a thickness (d) of a retardation film, and an average refractive index (n0) of the retardation film; and using the following equations (i) to (iii) for computational numerical calculation. Then, Rth can be calculated from the following equation (iv). Here, φ and ny' are represented by the following respective equations (v) and (vi).

$$Re = (nx - ny) \times d \quad \text{(i)}$$

$$R40 = (nx - ny') \times d / \cos(\phi) \quad \text{(ii)}$$

$$(nx + ny + nz)/3 = n0 \quad \text{(iii)}$$

$$Rth = (nx - nz) \times d \quad \text{(iv)}$$

$$\phi = \sin^{-1}[\sin(40°)/n0] \quad \text{(v)}$$

$$ny' = ny \times nz / [ny^2 \times \sin^2(\phi) + nz^2 \times \cos^2(\phi)]^{1/2} \quad \text{(vi)}$$

Generally, retardation value of a retardation film may vary depending on wavelength. This phenomenon is referred to as a wavelength dispersion property of a retardation film. In the specification of the present invention, the wavelength dispersion property can be determined by a ratio of in-plane retardation values Re[480]/Re[590] measured by using light of wavelengths of 480 nm and 590 nm at 23° C.

The positive A plate has Re[480]/Re[590] of preferably 0.8 to 1.2, more preferably 0.8 to 1.1, and particularly preferably 0.8 to 1.0. Smaller Re[480]/Re[590] within the above ranges provides uniform retardation values in a wide visible light region. As a result, in a liquid crystal display apparatus employing the positive A plate, light of a specific wavelength hardly leaks and a color shift in an oblique direction can be even further reduced in a black display of the liquid crystal display apparatus.

D-2. Means for Arranging Positive A Plate

Referring to FIGS. 1, 2A, and 2B, the positive A plate 30 is arranged between the first polarizer 20 and the positive C plate 40. Any appropriate method may be employed as a method of arranging the positive A plate 30 between the first polarizer 20 and the positive C plate 40 depending on the purpose. The positive A plate 30 is preferably bonded to the first polarizer 20 and the positive C plate 40 by providing an adhesive layer or pressure sensitive adhesive layer (not shown) on each side of the positive A plate 30. In this way, contrast of a liquid crystal display apparatus employing the positive A plate 30 can be increased.

A thickness of the adhesive layer or pressure sensitive adhesive layer may be appropriately determined in accordance with intended use, adhesive strength, and the like. The adhesive layer has an appropriate thickness of generally 0.1 to 50 μm, preferably 0.1 to 20 μm, and particularly preferably 0.1 to 10 μm. The pressure sensitive adhesive layer has an appropriate thickness of generally 1 to 100 μm, preferably 5 to 80 μm, and particularly preferably 10 to 50 μm.

Any appropriate adhesive or pressure sensitive adhesive may be employed for forming the adhesive layer or pressure sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, in a case where one adherend is a polarizer prepared by adsorbing a dichromatic substance such as iodine on a polyvinyl alcohol-based film and uniaxially stretching the film, an aqueous adhesive is preferably used as the adhesive. An adhesive containing a polyvinyl alcohol-based resin as a main component is particularly preferably used. A specific example thereof includes an adhesive "GOHSEFIMER Z200" (trade name, available from Nippon Synthetic Chemical Industry Co., Ltd.) containing as a main component modified polyvinyl alcohol having an acetoacetyl group. An acrylic pressure sensitive adhesive containing an acrylic polymer as a base polymer is preferably used as the pressure sensitive adhesive from the viewpoints of excellent optical transparency, appropriate pressure sensitive adhesive properties such as wetting property, agglomeration property, and adhesiveness, and excellent weatherability and thermal resistance. A specific example thereof includes a double-face optical tape "SK-2057" (trade name, available from Soken Chemical & Engineering Co., Ltd.) containing an acrylic pressure sensitive adhesive as a pressure sensitive adhesive layer.

The positive A plate 30 is preferably arranged such that its slow axis is substantially perpendicular to an absorption axis of the adjacent first polarizer 20. In the specification of the present invention, the phrase "substantially perpendicular" includes a case where the slow axis of the positive A plate 30 and the absorption axis of the first polarizer 20 form an angle of 90°±2.0°, preferably 90°±1.0°, and more preferably 90°±0.5°. An angle greatly departing from the above ranges tends to cause reduction in contrast of a liquid crystal display apparatus employing the positive A plate 30.

D-3. Structure of Positive A Plate

A structure (laminate structure) of the positive A plate is not particularly limited as long as the optical properties as described in the above section D-1 are satisfied. To be specific, the positive A plate may be a single retardation film, or a laminate of two or more retardation films. The positive A plate is preferably a single retardation film for reducing shift or unevenness in retardation values due to shrinkage stress of the polarizer or heat of backlight and for reducing a thickness of a liquid crystal panel. The positive A plate as a laminate may include an adhesive layer, a pressure sensitive adhesive layer, or the like for attaching two or more retardation films. In a case where the positive A plate as a laminate includes two or more retardation films, the retardation films may be identical to or different from each other. Details of the retardation film will be described below.

Re[590] of a retardation film used for the positive A plate can be appropriately selected in accordance with the number of retardation films to be used. For example, in a case where the positive A plate is formed of a single retardation film, Re[590] of the retardation film is preferably equal to Re[590] of the positive A plate. Thus, retardation of a pressure sensitive adhesive layer, an adhesive layer, or the like used for laminating the positive A plate on the polarizer or the positive C plate is preferably as small as possible. Further, in a case where the positive A plate is a laminate including two or more retardation films, for example, the laminate is preferably designed such that total Re[590] of the retardation films is equal to Re[590] of the positive A plate. To be specific, a positive A plate having Re[590] of 140 nm can be obtained by laminating two retardation films each having Re[590] of 70 nm such that respective slow axes are perpendicular to each other. The present specification describes the cases each employing two or less retardation films for simplicity, but the present invention may obviously be applied to a laminate including three or more retardation films.

A total thickness of the positive A plate is preferably 10 to 500 μm, more preferably 20 to 400 μm, and most preferably 30 to 300 μm. The positive A plate having a thickness within the above ranges can provide a liquid crystal display apparatus with excellent optical uniformity.

D-4. Retardation Film Used for Positive A Plate

The retardation film used for the positive A plate is preferably a retardation film having excellent transparency, mechanical strength, thermal stability, water barrier property, and the like, and hardly causing optical unevenness due to distortion. A stretched film of a polymer film containing a thermoplastic resin as a main component is preferably used as the retardation film. In the specification of the present invention, the term "stretched film" refers to a plastic film having enhanced alignment of molecules in a specific direction obtained by: applying tension to an unstretched film at an appropriate temperature; or applying additional tension to a film stretched in advance.

The retardation film has a light transmittance of preferably 80% or more, more preferably 85% or more, and particularly preferably 90% or more measured by using light of a wavelength of 590 nm at 23° C. A theoretical upper limit of the light transmittance is 100%, and a feasible upper limit thereof may be 94%. The positive A plate preferably has a similar light transmittance as a whole.

An absolute value of photoelastic coefficient C[590] (m²/N) of the retardation film is preferably $2.0 \times 10^{-13}$ to $1.0 \times 10^{-10}$, more preferably $1.0 \times 10^{-12}$ to $1.0 \times 10^{-10}$, and particularly preferably $1.0 \times 10^{-12}$ to $3.0 \times 10^{-11}$. An absolute value of photoelastic coefficient within the above ranges can provide a liquid crystal display apparatus with excellent display uniformity.

The retardation film may have any appropriate thickness depending on the purpose or the laminate structure of the positive A plate. In a case where the positive A plate is formed of a single retardation film, the retardation film has a thickness equal to a total thickness of the positive A plate. Further, in a case where the positive A plate has a laminate structure, a thickness of each retardation film may be set such that a total thickness of the retardation films is equal to a preferred total thickness of the positive A plate. The retardation films may each have an identical thickness or a different thickness. To be specific, the thickness of the retardation film is preferably 10 to 250 μm, more preferably 20 to 200 μm, and particularly preferably 30 to 150 μm. A thickness of the retardation film within the above ranges can provide a retardation film with excellent mechanical strength and display uniformity.

Any appropriate forming method may be employed as a method of obtaining the polymer film containing a thermoplastic resin as a main component. Any appropriate method may be selected from compression molding, transfer molding, injection molding, extrusion, blow molding, powder molding, FRP molding, solvent casting, and the like. Of those, extrusion and solvent casting are preferred because a highly smooth retardation film with favorable optical uniformity can be obtained. To be specific, the extrusion involves: melting a resin composition containing a thermoplastic resin as a main component, a plasticizer, an additive, and the like under heating; extruding the melted resin composition into a thin film on a surface of a casting roller by using a T-die or the like; and cooling the whole to produce a film. Further, the solvent casting involves: defoaming a rich solution (dope) prepared by dissolving in a solvent a resin composition containing a thermoplastic resin as a main component, a plasticizer, an additive, and the like; uniformly casting the defoamed solution into a thin film on a surface of an endless stainless steel belt or rotating drum; and evaporating the solvent to produce a film. Forming conditions may be appropriately selected in accordance with the composition or kind of the resin to be used, the forming method, and the like.

A glass transition temperature (Tg) of the above-mentioned polymer film is not particularly limited, but is preferably 110 to 185° C., more preferably 120 to 180° C., and particularly preferably 125 to 175° C. Tg of 110° C. or higher facilitates formation of a film with favorable thermal stability, and Tg of 185° C. or lower facilitates control of in-plane and thickness direction retardation values of the film through stretching. The glass transition temperature (Tg) can be determined through differential scanning calorimetry (DSC) in accordance with JIS K7121.

Examples of a material forming the thermoplastic resin include: general purpose plastics such as polyethylene, polypropylene, polynorbornene, polyvinyl chloride, a cellulose ester, polystyrene, an ABS resin, an AS resin, polymethylmethacrylate, polyvinyl acetate, and polyvinylidene chloride; general purpose engineering plastics such as polyamide, polyacetal, polycarbonate, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystal polymer, polyamideimide, polyimide, and polytetrafluoroethylene. The thermoplastic resin may be used after appropriate polymer modification. Examples of the polymer modification include copolymerization, branching, crosslinking, and modifications in molecular terminals and stereoregularity. Two or more kinds of thermoplastic resins may be mixed and used.

The polymer film containing a thermoplastic resin as a main component may further contain any appropriate additive as required. Specific examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and a thickener. The kind and amount of the additive to be used may be appropriately set depending on the purpose. A use amount of the additive is generally 0.1 to 10 or less (weight ratio) with respect to a total solid content in the polymer film as 100.

The retardation film used for the positive A plate of the present invention is preferably a stretched film of a polymer film containing polynorbornene or polycarbonate as a main component because of its excellent transparency, mechanical strength, thermal stability, and water barrier property, developability of retardation values, easy control of retardation values, adhesiveness to a polarizer, and the like.

The polynorbornene refers to a (co)polymer obtained by using a norbornene-based monomer having a norbornene ring as a part or entire starting material (monomer). The polynorbornene is obtained by using as a starting material a norbornene-based monomer having a norbornene ring (having a double bond in a norbornane ring) However, the (co)polymer may or may not have a norbornane ring in a repeating unit. Polynorbornene as a (co)polymer having no norbornane ring is one obtained from a monomer forming a five-membered ring through ring opening, and typical examples of the monomer include norbornene, dicyclopentadiene, 5-phenylnorbornene, and derivatives thereof. In a case where the polynorbornene is a copolymer, an arrangement of its repeating units is not particularly limited. The polynorbornene may be a random copolymer, a block copolymer, or a graft copolymer.

Examples of the polynorbornene include: (A) a resin obtained through hydrogenation of a ring-opened (co)polymer of a norbornene-based monomer; and (B) a resin obtained through addition (co)polymerization of a norbornene-based monomer. The ring-opened (co)polymer of a norbornene-based monomer includes a resin obtained through hydrogenation of a ring-opened copolymer of one or more norbornene-based monomers, and α-olefins, cycloalkenes, and/or disconjugate dienes. The resin obtained through addition (co)polymerization of a norbornene-based monomer includes a resin obtained through addition (co)polymerization of one or more norbornene-based monomers, and α-olefins, cycloalkenes, and/or disconjugate dienes. The retardation film used for the positive A plate preferably includes a resin obtained through hydrogenation of a ring-opened (co) polymer of a norbornene-based monomer, to thereby obtain a highly uniform retardation film having excellent moldability and large retardation values. More preferably, the retardation film used in the present invention includes a resin obtained through hydrogenation of a ring-opened (co) polymer of a norbornene-based monomer and containing at least repeating units represented by the following general formulae (1), (2), and/or (3).

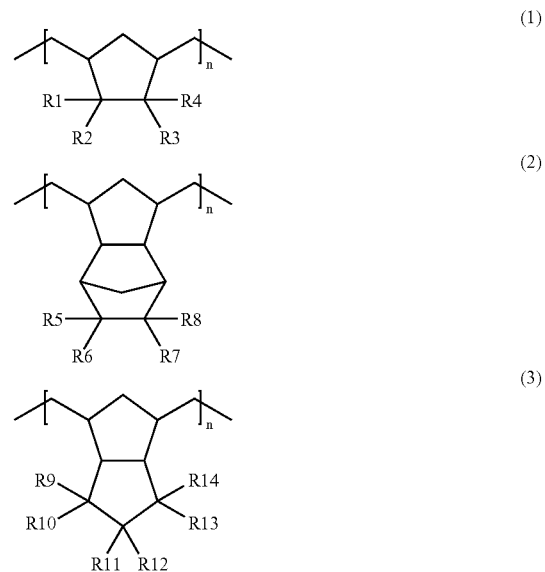

In the general formulae (1), (2), and (3), R1 to R14 each independently represent hydrogen, a halogen, a halogenated alkyl group having 1 to 5 carbon atoms, an alkyl group having 1 to 5 carbon atoms, an alkylidene group having 1 to 5 carbon atoms, an alkenyl group having 1 to 5 carbon atoms, an alkoxycarbonyl group having 1 to 5 carbon atoms, an aryl group, an aralkyl group, an aralkyloxy group, a hydroxyalkyl group, a cyano group, a cycloalkyl group having 4 to 10 carbon atoms, or an acyloxy group, or a substituted derivative thereof, and n represents an integer of 1 or more.

Particularly preferably, in the general formula (1), R1 to R4 each independently represent hydrogen, a halogen, a halogenated alkyl group having 1 to 5 carbon atoms, an alkyl group having 1 to 5 carbon atoms, an alkylidene group having 1 to 5 carbon atoms, an alkenyl group having 1 to 5 carbon atoms, an alkoxycarbonyl group having 1 to 5 carbon atoms, an aryl group, an aralkyl group, an aralkyloxy group, a cycloalkyl group having 4 to 10 carbon atoms, or an acyloxy group, and n represents an integer of 1 or more. In addition, in the general formula (2), R5 and R6 each independently represent hydrogen, a halogen, a halogenated alkyl group having 1 to 5 carbon atoms, an alkyl group having 1 to 5 carbon atoms, an alkylidene group having 1 to 5 carbon atoms, an alkenyl group having 1 to 5 carbon atoms, or an alkoxycarbonyl group having 1 to 5 carbon atoms, and n represents an integer of 1 or more. In addition, in the general formula (3), R9 to R14 each independently represent hydrogen or an alkyl group having 1 to 5 carbon atoms, and n represents an integer of 1 or more.

Most preferably, in the general formula (1), R1 and R2 each independently represent hydrogen, a trifluoromethyl group, a methyl group, an ethyl group, a methylidene group, an ethylidene group, a vinyl group, a propenyl group, a methoxycarbonyl group, an ethoxycarbonyl group, a phenyl group, an ethyl phenyl group, a benzoyloxy group, a cyclopentyl group, or a cyclohexyl group, R3 and R4 each represent hydrogen, and n represents an integer of 1 or more. In addition, in the general formula (2), R5 and R6 each independently represent hydrogen, a trifluoromethyl group, a methyl group, an ethyl group, a methylidene group, an ethylidene group, a vinyl group, a propenyl group, a methoxycarbonyl group, or an ethoxycarbonyl group, R7 and R8 each represent hydrogen, and n represents an integer of 1 or more. In addition, in the general formula (3), R9 to R12 each independently represent hydrogen or a methyl group, R13 and R14 each represent hydrogen, and n represents an integer of 1 or more.

Any appropriate monomers are selected as the norbornene-based monomer. For example, bicyclo[2.2.1]-hept-2-ene (common name: norbornene) and a derivative thereof can be used. Specific examples thereof include 5-methyl-bicyclo[2.2.1]-hept-2-ene,
5,5-dimethyl-bicyclo[2.2.1]-hept-2-ene,
5-ethyl-bicyclo[2.2.1]-hept-2-ene,
5-propyl-bicyclo[2.2.1]-hept-2-ene,
5-butyl-bicyclo[2.2.1]-hept-2-ene,
5-methylidene-bicyclo[2.2.1]-hept-2-ene,
5-ethylidene-bicyclo[2.2.1]-hept-2-ene,
5-vinyl-bicyclo[2.2.1]-hept-2-ene,
5-propenyl-bicyclo[2.2.1]-hept-2-ene,
5-methoxycarbonyl-bicyclo[2.2.1]-hept-2-ene,
5-ethoxycarbonyl-bicyclo[2.2.1]-hept-2-ene,
5-methyl-5-methoxycarbonyl-bicyclo[2.2.1]-hept-2-ene,
5-methyl-5-ethoxycarbonyl-bicyclo[2.2.1]-hept-2-ene,
5-phenyl-bicyclo[2.2.1]-hept-2-ene,
5-cyclopentyl-bicyclo[2.2.1]-hept-2-ene,
5-cyclohexyl-bicyclo[2.2.1]-hept-2-ene,
5-benzoyloxy-5-methylbicyclo[2.2.1]-hept-2-ene,
5-trifluoromethyl-bicyclo[2.2.1]-hept-2-ene,
5,6-bis(trifluoromethyl)-bicyclo[2.2.1]-hept-2-ene,
5-benzyl-bicyclo[2.2.1]-hept-2-ene,
5-tolyl-bicyclo[2.2.1]-hept-2-ene,
5-(ethylphenyl)-bicyclo[2.2.1]-hept-2-ene,
5-(isopropylphenyl)-bicyclo[2.2.1]-hept-2-ene,
5-cyano-bicyclo[2.2.1]-hept-2-ene,
bicyclo[2.2.1]-hept-5-enyl-2-propionate,
bicyclo[2.2.1]-hept-5-enyl-2-methyloctanoate,
bicyclo[2.2.1]-hept-5-ene-5,6-dicarboxylic anhydride, and
5-hydroxymethyl-bicyclo[2.2.1]-hept-5-ene, and polar group (such as halogen)-substituted products thereof.

Tricyclo[4.3.1$^{2,5}$.0$^{1,6}$]-deca-3,7-diene (common name: dicyclopentadiene) and a derivative thereof can also be used. Specific examples thereof include
2,3-dihydro-tricyclo[4.3.1$^{2,5}$.0$^{1,6}$]-deca-3,7-diene,
tricyclo[4.3.1$^{2,5}$.0$^{1,6}$]-deca-3-ene,
2-methyl-tricyclo[4.3.1$^{2,5}$.0$^{1,6}$]-deca-3-ene, and
5-methyl-tricyclo[4.3.1$^{2,5}$.0$^{1,6}$]-deca-3-ene, and polar group (such as halogen)-substituted products thereof.

Tricyclo[4.4.1$^{2,5}$.0$^{1,6}$]-undeca-3,7-diene, tricyclo[4.4.1$^{2,5}$.0$^{1,6}$]-undeca-3,8-diene, and tricyclo[4.4.1$^{2,5}$.0$^{1,6}$]-undeca-3-ene, and derivatives (such as polar group (such as halogen)-substituted products) thereof can be used.

Tetracyclo[4.4.1$^{2,5}$.1$^{7,10}$.0]-dodeca-3-ene (common name: tetracyclododecene) and a derivative thereof can also be used. Specific examples thereof include
8-methyl-tetracyclo[4.4.1$^{2,5}$.1$^{7,10}$.0]-dodeca-3-ene,
8-ethyl-tetracyclo[4.4.1$^{2,5}$.1$^{7,10}$.0]-dodeca-3-ene,
8-methylidene-tetracyclo[4.4.1$^{2,5}$.1$^{7,10}$.0]-dodeca-3-ene,
8-ethylidene-tetracyclo[4.4.1$^{2,5}$.1$^{7,10}$.0]-dodeca-3-ene,
8-vinyl-tetracyclo[4.4.1$^{2,5}$.1$^{7,10}$.0]-dodeca-3-ene,
8-propenyl-tetracyclo[4.4.1$^{2,5}$.1$^{7,10}$.0]-dodeca-3-ene,
8-methoxycarbonyl-tetracyclo[4.4.1$^{2,5}$.1$^{7,10}$.0]-dodeca-3-ene,
8-ethoxycarbonyl-tetracyclo[4.4.1$^{2,5}$.1$^{7,10}$.0]-dodeca-3-ene,
8-n-propoxycarbonyl-tetracyclo[4.4.1$^{2,5}$.1$^{7,10}$.0]-dodeca-3-ene,
8-butoxycarbonyl-tetracyclo[4.4.1$^{2,5}$.1$^{7,10}$.0]-dodeca-3-ene,
8-phenoxycarbonyl-tetracyclo[4.4.1$^{2,5}$.1$^{7,10}$.0]-dodeca-3-ene,
8-trifluoromethyl-tetracyclo[4.4.1$^{2,5}$.1$^{7,10}$.0]-dodeca-3-ene,
8-methyl-8-trifluoromethyl-tetracyclo[4.4.1$^{2,5}$.1$^{7,10}$.0]-dodeca-3-ene,
8-methyl-8-methoxycarbonyl-tetracyclo[4.4.1$^{2,5}$.1$^{7,10}$.0]-dodeca-3-ene,
8-methyl-8-ethoxycarbonyl-tetracyclo[4.4.1$^{2,5}$.1$^{7,10}$.0]-dodeca-3-ene,
8-methyl-8-n-propoxycarbonyl-tetracyclo[4.4.1$^{2,5}$.1$^{7,10}$.0]-dodeca-3-ene,
8-methyl-8-butoxycarbonyl-tetracyclo[4.4.1$^{2,5}$.1$^{7,10}$.0]-dodeca-3-ene, and
8-methyl-8-phenoxycarbonyl-tetracyclo[4.4.1$^{2,5}$.1$^{7,10}$.0]-dodeca-3-ene, and polar group (such as halogen)-substituted products thereof. The norbornene-based monomers may be used alone or in combination. The norbornene-based monomer may be used after having been subjected to any appropriate modification.

Octahydronaphthalene and a derivative thereof can also be used. Specific examples thereof include 1,4:5,8-dimethano-1,4,4a,5,6,7,8a-octahydronaphthalene and 6-methyl-1,4:5,8-dimethano-1,4,4a,5,6,7,8a-octahydronaphthalene.

The norbornene-based monomer is preferably
5-methyl-bicyclo[2.2.1]-hept-2-ene,
5-ethyl-bicyclo[2.2.1]-hept-2-ene,
5,5-dimethyl-bicyclo[2.2.1]-hept-2-ene,
5-ethylidene-bicyclo[2.2.1]-hept-2-ene,
5-methoxycarbonyl-bicyclo[2.2.1]-hept-2-ene,
5-methyl-5-methoxycarbonyl-bicyclo[2.2.1]-hept-2-ene,
5-phenyl-bicyclo[2.2.1]-hept-2-ene,
tricyclo[4.3.1$^{2,5}$.0$^{1,6}$]-deca-3,7-diene,
2,3-dihydro-tricyclo[4.3.1$^{2,5}$.0$^{1,6}$]-deca-3,7-diene,
tricyclo[4.3.1$^{2,5}$.0$^{1,6}$]-deca-3-ene,
tetracyclo[4.4.1$^{2,5}$.1$^{7,10}$.0]-dodeca-3-ene,
8-methyl-tetracyclo[4.4.1$^{2,5}$.1$^{7,10}$.0]-dodeca-3-ene,
8-methoxycarbonyl-tetracyclo[4.4.1$^{2,5}$.1$^{7,10}$.0]-dodeca-3-ene,
8-methyl-8-methoxycarbonyl-tetracyclo[4.4.1$^{2,5}$.1$^{7,10}$.0]-dodeca-3-ene, 1,4:5,8-dimethano-1,4,4a,5,6,7,8a-octahydronaphthalene or
6-methyl-1,4:5,8-dimethano-1,4,4a,5,6,7,8a-octahydronaphthalene, or a combination thereof.

The α-olefins has preferably 2 to 20 carbon atoms, or more preferably 2 to 10 carbon atoms. Specific examples of the α-olefins include ethylene, propylene, 1-butene, 3-methyl-1-butene, 1-pentene, 3-methyl-1-pentene, 4-methyl-1-pentene, 4,4-dimethyl-1-pentene, 1-hexene, 3-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, and 1-eicosene. Of those, ethylene is particularly preferred. Those α-olefins may be used alone or in combination. The α-olefins may be copolymerized with other vinyl-based monomers as required unless an effect of the present invention is impaired.

Examples of the cycloalkenes include cyclobutene, cyclopentene, cyclohexene, 3-methyl-cyclohexene, 3,4-dimethyl-cyclohexene, 2-(2-methylbutyl)-1-cyclohexene, cycloheptene, cyclooctene, 6-bromo-3-chloro-4-methylcyclohexene, 3a,5,6,7a-tetrahydro-4,7-methano-1H-indene, and 5,6-dihydrodicyclopentadiene. Those cycloalkenes may be used alone or in combination. Those cycloalkenes may be copolymerized with other vinyl-based monomers as required unless the effect of the present invention is impaired.

Examples of the disconjugate diene include 1,4-hexadiene, 4-methyl-1,4-hexadiene, 5-methyl-1,4-hexadiene, and 1,7-octadiene. Those disconjugate dienes may be used alone or in combination. Those disconjugate dienes may be copolymerized with other vinyl-based monomers as required unless the effect of the present invention is impaired.

The resin obtained through hydrogenation of the ring-opened (co)polymer of a norbornene-based monomer can be obtained by: subjecting the norbornene-based monomer or the like to a metathesis reaction to obtain a ring-opened (co) polymer; and subjecting the ring-opened (co)polymer to hydrogenation. The resin is produced through, for example: a method described in "Development and applied techniques of optical polymer materials", published by NTS Inc., p. 103 to p. 111 (2003); a method described in paragraphs [0059] and [0060] of JP11-116780 A; a method described in paragraphs [0035] to [0037] of JP 2001-350017 A; and a method described in paragraph [0053] of JP 2005-008698 A, which are herein incorporated by reference.

Examples of a catalyst for ring opening polymerization used in metathesis reaction include: a halide of a metal such as ruthenium, rhodium, palladium, osmium, iridium, or platinum; a polymerization catalyst composed of a nitrate or acetylacetone compound, and a reducing agent; and a polymerization catalyst composed of a halide of a metal such as titanium, vanadium, zirconium, tungsten, or molybdenum, or acetylacetone compound, and an organic aluminum compound. Reaction conditions such as polymerization temperature and polymerization pressure may be appropriately selected in accordance with the type of norbornene-based monomer, intended molecular weight, and the like. In one embodiment of the present invention, a polymerization temperature is preferably −50° C. to 100° C., and a polymerization pressure is preferably 0 to 50 kgf/cm$^2$.

Each of the resins obtained by hydrogenating ring-opened (co)polymers of the norbornene-based monomers can be obtained through a hydrogenation reaction performed by blowing hydrogen in the presence of any appropriate hydrogenation catalysts. Specific examples of the hydrogenation catalyst include: a homogenous catalyst composed of a transition metal compound/an alkyl metal compound such as cobalt acetate/triethyl aluminum, nickel acetylacetonate/triisobutyl aluminum, titanocene dichloride/n-butyllithium, zirconocene dichloride/sec-butyllithium, or tetrabutoxy titanate/dimethyl magnesium; a heterogeneous metal catalyst such as nickel, palladium, or platinum; and a heterogeneous solid-carrying catalyst wherein a metal catalyst is carried on a carrier, such as nickel/silica, nickel/diatomaceous earth, nickel/alumina, palladium/carbon, palladium/silica, palladium/diatomaceous earth, or palladium/alumina.

The resin obtained through addition (co)polymerization of a norbornene-based monomer can be obtained through a method described in Example 1 of JP 61-292601 A, which is herein incorporated by reference.

The polynorbornene used in the present invention has a weight average molecular weight (Mw) of preferably 20,000 to 400,000, more preferably 30,000 to 300,000, particularly preferably 40,000 to 200,000, and most preferably 40,000 to 80,000, measured through a gel permeation chromatograph (GPC) method by using a toluene solvent. The polynorbornene having a weight average molecular weight within the above ranges has excellent mechanical strength, and favorable solubility, moldability, and operability in casting.

In a case where the polynorbornene is obtained through hydrogenation of the ring-opened (co) polymer of a norbornene-based monomer, a hydrogenation rate is preferably 90% or more, more preferably 95% or more, and most preferably 99% or more. The polynorbornene obtained at hydrogenation rate within the above ranges has excellent heat resistance and excellent light resistance. The hydrogenation rate can be obtained by: subjecting the polynorbornene to $^1$H-NMR (500 MHz) measurement; and determining the hydrogenation rate from an integrated intensity ratio of paraffin-based hydrogen atoms to olefin-based hydrogen atoms.

The retardation film used for the positive A plate may include two or more types of polynorbornenes. The retardation film may include another thermoplastic resin in addition to the polynorbornene. A content (weight ratio) of the other thermoplastic resin is preferably more than 0 and 50 or less, and more preferably more than 0 and 40 or less with respect to a total solid content of the retardation film as 100. The content of the other thermoplastic resin within the above ranges can provide a retardation film having a small photoelastic coefficient, favorable wavelength dispersion properties, and excellent durability, mechanical strength, and transparency.

Any appropriate one is selected as the thermoplastic resin depending on purposes. Specific examples thereof include: general-purpose plastics such as a polyolefin resin, a polyvinyl chloride-based resin, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general-purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline re-sin, a polyamide-imide-based resin, a polyimide-based resin, and a polytetrafluoroethylene-based resin. Those thermoplastic resins may be used alone or in combination. Those thermoplastic resins may be used after having been subjected to any appropriate polymer modification. Examples of the polymer modification include copolymerization, cross-linking, a molecular terminal modification, and stereoregularity modification.

In a case where the retardation film used for the positive A plate is a stretched polymer film containing the polynorbornene and other thermoplastic resin, the other thermoplastic resin is preferably a styrene-based resin. The styrene-based resin is used for adjusting the wavelength dispersion properties or photoelastic coefficient of the retardation film. In the specification of the present invention, the term "styrene-based resin" refers to a polymer obtained by polymerizing a styrene-based monomer. Examples of the styrene-based monomer include styrene, α-methylstyrene, o-methylstyrene, p-methylstyrene, p-chlorostyrene, p-nitrostyrene, p-aminostyrene, p-carboxystyrene, p-phenylstyrene, and 2,5-dichlorostyrene.

The styrene-based resin may be a copolymer obtained through a reaction of the styrene-based monomer and another monomer. Specific examples of the copolymer include a styrene/maleimide copolymer, a styrene/maleic anhydride copolymer, and a styrene/methyl methacrylate copolymer. In a case where the styrene-based resin is a copolymer obtained through a reaction of the styrene-based monomer and another monomer, a content of the styrene-based monomer is preferably 50 mol % or more and less than 100 mol %, more preferably 60 mol % or more and less than 100 mol %, and most preferably 70 mol % or more and less than 100 mol %. The content of the styrene-based monomer within the above ranges can provide a retardation film having a small photoelastic coefficient and excellent wavelength dispersion properties.

The styrene-based resin has a weight average molecular weight (Mw) of preferably 1,000 to 400,000, and more preferably 2,000 to 300,000, measured through a gel permeation chromatograph (GPC) method by using a tetrahydrofuran solvent. The styrene-based resin having a weight average molecular weight within the above ranges has favorable solubility or moldability.

An aromatic polycarbonate composed of an aromatic dihydric phenol component and a carbonate component is preferably used as the polycarbonate-based resin used in the present invention. The aromatic polycarbonate can generally be obtained through a reaction between an aromatic dihydric phenol compound and a carbonate precursor. That is, the aromatic polycarbonate can be obtained through: a phosgene method in which phosgene is blown to an aromatic dihydric phenol compound in the presence of a caustic alkali and a solvent; or an ester exchange method in which an aromatic dihydric phenol compound and a bisaryl carbonate are subjected to ester exchange in the presence of a catalyst.

Specific examples of the aromatic dihydric phenol compound include: 2,2-bis(4-hydroxyphenyl)propane;
9,9-bis(4-hydroxyphenyl)fluorene; 4,4'-biphenol;
4,4'-dihydroxybiphenyl ether;
2,2-bis(3-methyl-4-hydroxyphenyl)propane;
2,2-bis(3-bromo-4-hydroxyphenyl)propane;
2,2-bis(4-hydroxy-3,5-dimethylphenyl)propane;
bis(4-hydroxyphenyl)methane; 1,1-bis(4-hydroxyphenyl)ethane;
2,2-bis(4-hydroxyphenyl)butane;
2,2-bis(4-hydroxy-3,5-dimethylphenyl)butane;
2,2-bis(4-hydroxy-3,5-dipropylphenyl)propane;
1,1-bis(4-hydroxyphenyl)cyclohexane; and
1,1-bis(4-hydroxyphenyl)-3,3,5-trimethylcyclohexane. The aromatic dihydric phenol compound may be used alone or in combination.

Examples of the carbonate precursor include phosgene, bischloroformates of the above-mentioned dihydric phenols, diphenyl carbonate, di-p-tolylcarbonate, phenyl-p-tolylcarbonate, di-p-chlorophenyl carbonate, and dinaphthyl carbonate. Of those, phosgene and diphenyl carbonate are preferred.

The polycarbonate has a weight average molecular weight (Mw) of preferably 25,000 to 250,000, more preferably 30,000 to 200,000, and particularly preferably 40,000 to 100,000 determined through gel permeation chromatography (GPC) by using a tetrahydrofuran solvent. A polycarbonate having a weight average molecular weight within the above ranges can provide a polymer film with excellent mechanical strength, solubility, forming property, and casting workability.

Of those, a polycarbonate containing a repeating unit (C) represented by the following general formula (4) and a repeating unit (D) represented by the following general formula (5) and having a fluorene structure is preferably used for the positive A plate from the viewpoints of excellent wavelength dispersion property and easily developing retardation values.

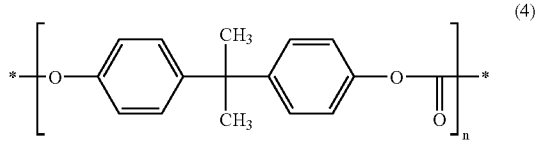

(4)

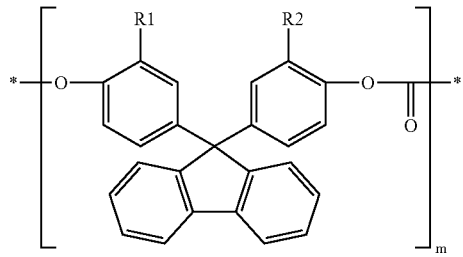

(5)

In the formulae, R1 and R2 each independently represent hydrogen, a halogen, a halogenated alkyl group having 1 to 5 carbon atoms, an alkyl group having 1 to 5 carbon atoms, an alkoxy group having 1 to 5 carbon atoms, an alkoxycarbonyl group having 1 to 5 carbon atoms; an alkylcarbonyloxy group having 1 to 5 carbon atoms, and substituted derivatives thereof. In the formulae, n and m each represent an integer of 1 or more, and R1 and R2 each more preferably represent an alkyl group having 1 to 5 carbon atoms, and particularly preferably represent a methyl group.

In the polycarbonate containing a repeating unit (C) represented by the general formula (4) and a repeating unit (D) represented by the general formula (5), a ratio (C:D) of the repeating unit (C) to the repeating unit (D) is preferably 2:8 to 4:6. A polycarbonate having a ratio (C:D) within the above range is formed into a retardation film with uniform retardation values in a wide visible light region. As a result, a color shift in an oblique direction can be reduced in a black display of the liquid crystal display apparatus. Note that the ratio may appropriately be adjusted by a ratio of monomers (for example, the aromatic dihydric phenol component) used.

In addition to the polymer films described above, a commercially available optical film as it is may be used as the retardation film used for the positive A plate. A commercially available optical film may be subjected to fabrication such as stretching treatment and/or relaxation treatment before use. Specific examples of a commercially available polynorbornene film include: "ZEONEX series" (480, 480R, etc., trade name, available from Zeon Corporation); "ZEONOR series" (ZF14, ZF16, etc., trade name, available from Zeon Corporation); and "ARTON series" (ARTON G, ARTON F, etc., trade name, available from JSR Corporation). Specific examples of a commercially available polycarbonate film include: "Pureace series" (trade name, available from Teijin Ltd.); "Elmech series" (R140, R435, etc., tradename, available from Kaneka Corporation); and "Illuminex series" (trade name, available from GE Plastics Japan, Ltd.).

Any appropriate stretching method may be employed as a method of forming a stretched film of a polymer film containing a thermoplastic resin as a main component. Specific examples of the stretching method include: a longitudinal uniaxial stretching method; a transverse uniaxial stretching method; a longitudinal and transverse simultaneous biaxial stretching method; and a longitudinal and transverse sequential biaxial stretching method. Any appropriate stretching machine such as a roll stretching machine, a tenter stretching machine, or a biaxial stretching machine may be used as stretching means. In a case where heat stretching is performed, a stretching temperature may be continuously changed or may be changed in steps. The stretching may be performed in two or more steps. A longitudinal uniaxial stretching method or a transverse uniaxial stretching method is preferably used because a retardation film having small variation in slow axes in a film width direction may be obtained. The longitudinal uniaxial stretching method is appropriately used for enhancing uniaxial property of molecules (alignment direction of molecules is easily aligned in a specific direction) and has such a feature in that large retardation values can be obtained even with a material hardly causing retardation values. The transverse uniaxial stretching method allows roller production of a laminate having a retardation film and a polarizer attached, in which a slow axis of the retardation film and an absorption axis of the polarizer are perpendicular to each other, and has such a feature in that productivity may be significantly enhanced.

A temperature inside a stretching oven (also referred to as stretching temperature) during stretching of the polymer film is preferably equal to or higher than a glass transition temperature (Tg) of the polymer film because retardation values easily even out in a width direction and the film hardly crystallizes (becomes clouded). The stretching temperature is preferably Tg+1° C. to Tg+30° C. More specifically, the stretching temperature is typically 110 to 200° C., and more preferably 120 to 180° C. The glass transition temperature can be determined through a method in accordance with JIS K7121-1987 by differential scanning calorimetry (DSC).

A specific method of controlling the temperature inside the stretching oven is not particularly limited, and may be appropriately selected from heating methods or temperature control methods using: an air-circulating thermostatic oven in which hot air or cool air circulates; a heater using microwaves, far infrared rays, or the like; a heated roller for temperature adjustment; a heat pipe roller; and a heated metal belt.

A stretch ratio during stretching of the polymer film is not particularly limited and may be appropriately determined in accordance with the composition of the polymer film, the kind of a volatile component or the like, the residual amount of the volatile component or the like, designed retardation values, and the like. To be specific, the stretch ratio is preferably 1.05 times to 2.00 times. A delivery speed during stretching is not particularly limited, but is preferably 0.5 to 20 m/min in consideration of the machine accuracy, stability, and the like of the stretching machine.

E. Positive C Plate

In the specification of the present invention, the positive C plate refers to a positive uniaxial retardation optical element satisfying a refractive index profile of nz>nx=ny (where, nx and ny respectively represent main in-plane refractive indices in a slow axis direction and a fast axis direction, and nz represents a thickness direction refractive index). The positive uniaxial retardation optical element ideally has an optical axis in a normal direction of the film. In the specification of the present invention, nx=ny includes not only a case where nx and ny are exactly equal, but also a case where nx and ny are substantially equal. The phrase "case where nx and ny are substantially equal" as used herein includes a case where an in-plane retardation value (Re[590]) is 10 nm or less.

E-1. Optical Properties of Positive C Plate

The positive C plate used in the present invention has Re[590] of preferably 0 to 5 nm, and more preferably 0 to 2 nm. Re[590] within the above ranges can increase a contrast ratio in an oblique direction of the liquid crystal display apparatus.

The positive C plate used in the present invention has Rth[590] of preferably −200 to −30 nm, more preferably −180 to −40 nm, particularly preferably −160 to −50 nm, and most preferably −130 to −70 nm. Rth[590] within the above ranges can increase a contrast ratio in an oblique direction of the liquid crystal display apparatus.

E-2. Means for Arranging Positive C Plate

Referring to FIGS. 1, 2A, and 2B, the positive C plate 40 is arranged between the positive A plate 30 and the liquid crystal cell 10. Any appropriate method may be employed as a method of arranging the positive C plate 40 between the positive A plate 30 and the liquid crystal cell 10 depending on the purpose. The positive C plate 40 is preferably bonded to the positive A plate 30 and the liquid crystal cell 10 by providing an adhesive layer or pressure sensitive adhesive layer (not shown) on each side of the positive C plate 40. In this way, contrast of a liquid crystal display apparatus employing the positive C plate 40 can be increased.

A thickness of the adhesive layer or pressure sensitive adhesive layer may be appropriately determined in accordance with intended use, adhesive strength, and the like. The adhesive layer has a thickness of generally 0.1 to 50 μm, preferably 0.1 to 20 μm, and particularly preferably 0.1 to 10 μm. The pressure sensitive adhesive layer has a thickness of generally 1 to 100 μm, preferably 5 to 80 μm, and particularly preferably 10 to 50 μm.

Any appropriate adhesive or pressure sensitive adhesive may be employed for forming the adhesive layer or pressure sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, in a case where one adherend is a substrate (typically, glass substrate) used for the liquid crystal cell, a pressure sensitive adhesive is preferably used because when axis shift occurs during attaching of the polarizer, the polarizer may be peeled off (also referred to as reworked) for reusing the liquid crystal cell. An acrylic pressure sensitive adhesive containing an acrylic polymer as a base polymer is preferably used as a pressure sensitive adhesive used for attaching the positive C plate 40 to the surface of the liquid crystal cell 10 from the viewpoints of excellent optical transparency, appropriate pressure sensitive adhesive properties such as wetting property, agglomeration property, and adhesiveness, and excellent weatherability and thermal resistance. A specific example thereof includes a double-face optical tape "SK-2057" (trade name, available from Soken Chemical & Engineering Co., Ltd.) containing an acrylic pressure sensitive adhesive as a pressure sensitive adhesive layer.

In a case where nx and ny of the positive C plate 40 are exactly equal, the positive C plate 40 exhibits no in-plane birefringence and its slow axis is not detected. Thus, the positive C plate 40 may be arranged independently from the absorption axis of the first polarizer 20, the slow axis of the positive A plate 30, and an alignment direction of liquid crystal molecules in the liquid crystal cell 10. In a case where nx and ny of the positive C plate 40 are substantially equal but are slightly different, its slow axis may be detected. In this case, the positive C plate 40 is preferably arranged such that its slow axis is substantially parallel or perpendicular to the absorption axis of the first polarizer 20. In the specification of the present invention, the phrase "substantially parallel" includes a case where the slow axis of the positive C plate 40 and the absorption axis of the first polarizer 20 form an angle of 0°±2.0°, preferably 0°±1.0°, and more preferably 0°±0.5°. The phrase "substantially perpendicular" includes a case where the slow axis of the positive C plate 40 and the absorption axis of the first polarizer 20 form an angle of 90°±2.0°, preferably 90°±1.0°, and more preferably 90°±0.5°. An angle greatly departing from the above ranges tends to cause reduction in contrast of a liquid crystal display apparatus employing the positive C plate 40.

E-3. Structure of Positive C Plate

A structure (laminate structure) of the positive C plate is not particularly limited as long as the optical properties as described in the above section E-1 are satisfied. To be specific, the positive C plate may be a single retardation film, or a laminate of two or more retardation films. The positive C plate is preferably a single retardation film for reducing shift or unevenness in retardation values due to shrinkage stress of the polarizer or heat of backlight and for reducing a thickness of a liquid crystal panel. The positive C plate as a laminate may include an adhesive layer, a pressure sensitive adhesive layer, or the like for attaching two or more retardation films. In a case where the positive C plate as a laminate includes two or more retardation films, the retardation films may be identical to or different from each other. Details of the retardation film will be described below.

Rth[590] of a retardation film used for the positive C plate can be appropriately selected in accordance with the number of retardation films to be used. For example, in a case where the positive C plate is formed of a single retardation film, Rth[590] of the retardation film is preferably equal to Rth[590] of the positive C plate. Thus, retardation of a pressure sensitive adhesive layer, an adhesive layer, or the like used for laminating the positive C plate on the positive A plate or the liquid crystal cell is preferably as small as possible. Further, in a case where the positive C plate is a laminate including two or more retardation films, for example, the laminate is preferably designed such that total Rth[590] of the retardation films is equal to Rth[590] of the positive C plate. To be specific, a positive C plate having Rth[590] of −100 nm can be obtained by laminating two retardation films each having Rth[590] of −50 nm, or by laminating a retardation film having Rth[590] of +50 nm and a retardation film having Rth[590] of −150 nm, for example. In such cases, the two retardation films are laminated such that respective slow axes are perpendicular to each other, which can reduce an in-plane retardation value of the positive C plate. The present specification describes the cases each employing two or less retardation films for simplicity, but the present invention may obviously be applied to a laminate including three or more retardation films.

In a case where the positive C plate is formed of a single retardation film, a total thickness of the positive C plate is preferably 0.1 to 3 µm, more preferably 0.3 to 2 µm, and particularly preferably 0.5 to 2 µm. In a case where the positive C plate is formed of two or more retardation films, a total thickness of the positive C plate is preferably 10 to 200 µm, more preferably 20 to 150 µm, and particularly preferably 30 to 120 µm E-4. Retardation Film Used for Positive C Plate The retardation film used for the positive C plate is preferably a retardation film having excellent transparency, mechanical strength, thermal stability, water barrier property, and the like, and hardly causing optical unevenness due to distortion. The retardation film is preferably a hardened layer or cured layer of a homeotropically aligned liquid crystalline composition.

In the specification of the present invention, the term "homeotropically aligned" refers to a state of a liquid crystal compound in a liquid crystalline composition uniformly aligned parallel to a normal direction of a film. The term "hardened layer" refers to a layer obtained by cooling and hardening a softened, molten, or solution-state liquid crystalline composition. The term "cured layer" refers to a layer obtained by crosslinking the liquid crystalline composition through heat, a catalyst, light, and/or radiation into an insoluble and infusible, or hardly soluble and hardly fusible stable state. Note that, the "cured layer" includes a cured layer obtained from a hardened layer of the liquid crystalline composition.

In the specification of the present invention, the term "liquid crystalline composition" refers to a composition having a liquid crystal phase and exhibiting liquid crystallinity. Examples of the liquid crystal phase include a nematic liquid crystal phase, a smectic liquid crystal phase, and a cholesteric liquid crystal phase. The liquid crystalline composition used in the present invention preferably has a nematic liquid crystal phase, to thereby obtain a highly transparent retardation film. The liquid crystal phase develops from a liquid crystal compound having in a molecular structure a mesogenic group containing a cyclic unit or the like.

A content of the liquid crystal compound in the liquid crystalline composition is preferably 40 to 100 (weight ratio), more preferably 50 to 99 (weight ratio), and particularly preferably 70 to 98 (weight ratio) with respect to a total solid content as 100. The liquid crystalline composition may contain various additives such as a leveling agent, a polymerization initiator, an aligner, a thermal stabilizer, a lubricant, a plasticizer, and an antistatic agent without inhibiting the purpose of the present invention.

Examples of the mesogenic group containing a cyclic unit or the like of the liquid crystal compound include a biphenyl group, a phenylbenzoate group, a phenylcyclohexane group, an azoxybenzene group, an azomethine group, an azobenzene group, a phenyl pyrimidine group, a diphenylacetylene group, a diphenylbenzoate group, a bicyclohexane group, a cyclohexylbenzene group, and a terphenyl group. A terminal of the cyclic unit may have a substituent such as a cyano group, an alkyl group, an alkoxy group, or a halogen group. Of those, a mesogenic group containing a cyclic unit or the like to be used preferably has a biphenyl group or a phenylbenzoate group.

The liquid crystal compound to be used preferably has at least one polymerizable functional group in a part of a molecule. Examples of the polymerizable functional group include an acryloyl group, a methacryloyl group, an epoxy group, and a vinyl ether group. Of those, an acryoloyl group or a methacryloyl group is preferably used. Further, the liquid crystal compound preferably has two or more polymerizable functional groups in a part of a molecule, to thereby improve durability by a crosslinked structure formed through a polymerization reaction. A specific example of a liquid crystal compound having two polymerizable functional groups in a part of a molecule includes "Paliocolor LC242" (trade name, available from BASF Aktiengesellschaft).

The retardation film used for the positive C plate more preferably includes a liquid crystalline composition containing a liquid crystal compound described in JP 2002-174725 A, and is a hardened layer or cured layer obtained by homeotropically aligning the liquid crystalline composition. The retardation film used for the positive C plate particularly preferably includes a liquid crystalline composition containing a liquid crystal polymer represented by the following general formula (6), and is a hardened layer or cured layer obtained by homeotropically aligning the liquid crystalline composition. The retardation film used for the positive C plate most preferably includes a liquid crystalline composition containing a liquid crystal polymer represented by the following general formula (6) and a liquid crystal compound having at least one polymerizable functional group in a part of a molecule, and is a hardened layer or cured layer obtained by homeotropically aligning the liquid crystalline composition. Such a liquid crystalline composition can provide a highly transparent retardation film with excellent optical uniformity.

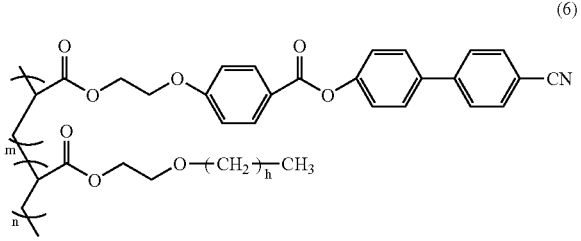

(6)

In the general formula (6), h represents an integer of 14 to 20. When a sum of m and n is 100, m is 50 to 70 and n is 30 to 50.

An example of a method of obtaining a homeotropically aligned liquid crystalline composition is a method involving applying a molten product or solution of a liquid crystalline composition on a substrate subjected to alignment treatment. A preferred example thereof includes a method involving applying on a substrate subjected to alignment treatment a solution (also referred to as application solution) prepared by dissolving a liquid crystalline composition in a solvent. Such a method can provide a retardation film with little alignment defects (also referred to as disclination) of the liquid crystalline composition.

The application solution may be prepared by using a commercially available solution of a liquid crystalline composition, or by adding a solvent to a commercially available solution containing a liquid crystalline composition. Alternatively, the application solution may be prepared by: dissolving a solid content of a liquid crystalline composition in various solvents; or adding various additives to a liquid crystal compound as required and adding a solvent to dissolve the additives.

A total solid content of the application solution varies depending on a solubility, an application viscosity, wetting property with respect to a substrate, a thickness after application, or the like. However, the solid content is generally 2 to 100 (weight ratio), more preferably 10 to 50 (weight ratio), and particularly preferably 20 to 40 (weight ratio) with respect to the solvent as 100. A solid content thereof within the above ranges can provide a retardation film with high surface uniformity.

A liquid substance capable of uniformly dissolving a liquid crystalline composition to prepare a solution may be employed as the solvent. Examples of the solvent include: a nonpolar solvent such as benzene or hexane; and a polar solvent such as water or alcohol. Further examples of the solvent include: an inorganic solvent such as water; and an organic solvent such as alcohols, ketones, ethers, esters, aliphatic and aromatic hydrocarbons, halogenated hydrocarbons, amides, and cellosolves. The solvent is preferably at least one solvent selected from cyclopentanone, cyclohexanone, methyl isobutyl ketone, methyl ethyl ketone, toluene, ethyl acetate, and tetrahydrofuran. Such solvent provides no adverse effects on the substrate in practical use such as corrosion and is capable of dissolving the liquid crystalline composition sufficiently.

The substrate is not particularly limited, and examples thereof that may be used include: a glass substrate such as a glass sheet or a quartz substrate; a polymer substrate such as a plastic film or a plastic substrate; a metal substrate such as an aluminum substrate or an iron substrate; an inorganic substrate such as a ceramic substrate; and a semiconductor substrate such as a silicon wafer. A polymer substrate is particularly preferred because it is excellent in smoothness of a substrate surface and wetting property with a liquid crystalline composition, and allows continuous production by using rollers so as to significantly improve productivity.

Examples of a material forming the polymer substrate include a thermosetting resin, a UV-curable resin, a thermoplastic resin, a thermoplastic elastomer, and a biodegradable plastic. Of those, a thermoplastic resin is preferably used. The thermoplastic resin may be a noncrystalline polymer or a crystalline polymer. The noncrystalline polymer has excellent transparency, and thus has an advantage in that a retardation film (positive C plate) can be used for a liquid crystal panel or the like as it is without being peeled off from a substrate. In contrast, the crystalline polymer has excellent rigidity, strength, and chemical resistance, and thus has an advantage in that a retardation film (positive C plate) can be produced stably. Polyethylene terephthalate is most preferably used for the polymer substrate because of its excellent surface uniformity, strength, chemical resistance, and production stability. The polyethylene terephthalate substrate is generally peeled off after a homeotropically aligned liquid crystalline composition is hardened or cured.

Any appropriate alignment treatment may be selected in accordance with the kind of liquid crystal compound, the material for the substrate, and the like. Specific examples thereof include: substrate surface direct alignment treatment (A); substrate surface indirect alignment treatment (B); and substrate surface deformation alignment treatment (C). In the specification of the present invention, the term "substrate surface direct alignment treatment (A)" refers to a method involving: forming a thin layer of an aligner on a substrate surface through a method such as solution application (wet treatment), or plasma polymerization or sputtering (dry treatment); and adjusting an alignment direction of a liquid crystal compound in a specific direction by utilizing interaction between the aligner and the liquid crystal compound. The term "substrate surface indirect alignment treatment (B)" refers to a method involving: applying a liquid crystalline composition having an aligner dissolved in advance on a substrate surface; and adjusting an alignment direction of a liquid crystal compound in a specific direction by utilizing a phenomenon of the aligner permeating from the liquid crystalline composition and adsorbing on the substrate surface and by utilizing interaction between the aligner and the liquid crystal compound. The term "substrate surface deformation alignment treatment (C)" refers to a method involving: deforming a substrate surface for forming a rough surface; and adjusting an alignment direction of a liquid crystal compound in a specific direction by utilizing interaction between the rough surface and the liquid crystal compound. Of those, the substrate surface direct alignment treatment (A) is preferably used in the present invention because this treatment has excellent aligning ability of the liquid crystal compound, to thereby provide a highly transparent retardation film with excellent optical uniformity.

Specific examples of the aligner subjected to solution application on the substrate surface include lecithin, stearic acid, hexadecyltrimethylammonium bromide, octadecylamine hydrochloride, a monobasic chromium carboxylate complex (such as a chromium myristate complex or a chromium perfluorononanoate complex), and an organic silane (such as a silane coupling agent or siloxane). Specific examples of the aligner subjected to plasma polymerization on the substrate surface include perfluorodimethylcyclohexane and tetrafluoroethylene. A specific example of the aligner subjected to sputtering on the substrate surface is polytetrafluoroethylene. Of those, an organic silane is particularly preferably used as the aligner because of its excellent workability, product quality, and aligning ability of the liquid crystal compound. A specific example of the organic silane as the aligner is "Ethyl silicate" (trade name, available from COLCOAT Co., Ltd.) containing tetraethoxysilane as a main component.

In addition to the methods described above, the aligner may be prepared by: using a commercially available aligner, or a commercially available solution or dispersion containing an aligner; adding a solvent to a commercially available aligner, or to a commercially available solution or dispersion containing an aligner; or dissolving or dispersing a solid content of an aligner in various solvents.

A method of applying the application solution on the substrate surface is not particularly limited. For example, an application method employing any appropriate coater may be used. Specific examples of the coater include a reverse roll coater, a positive rotation roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Of those, preferred examples of the coater used in the present invention include a reverse roll coater, a positive rotation roll coater, a gravure coater, a rod coater, a slot orifice coater, a curtain coater, a fountain coater, and a spin coater. An application method employing the above-mentioned coater can provide a very thin retardation film having excellent surface uniformity and optical uniformity.

A method of hardening and/or curing a liquid crystalline composition may be employed as a method of fixing a homeotropically aligned liquid crystalline composition in accordance with the kind of liquid crystal compound to be used. For example, in a case where a liquid crystalline composition contains a liquid crystal polymer as a liquid crystal compound, a molten product or solution containing the liquid crystal polymer is hardened, to thereby provide sufficient mechanical strength for practical use. Meanwhile, in a case where a liquid crystalline composition contains a liquid crystal monomer as a liquid crystal compound, hardening of a liquid crystal monomer solution may not provide sufficient mechanical strength. In this case, a polymerizable liquid crystal monomer having at least one polymerizable functional group in a part of a molecule is used, is irradiated with UV light, and is cured, to thereby provide sufficient mechanical strength for practical use.

A light source to be used for irradiation of UV light include an ultra-high pressure mercury lamp, a flash UV lamp, a high pressure mercury lamp, a low pressure mercury lamp, a deep UV lamp, a xenon lamp, a xenon flash lamp, and a metal halide lamp. UV light emitted from the light source may be non-polarized light or polarized light.

A wavelength of the light source to be used for UV irradiation may be determined in accordance with a light absorption wavelength range of a polymerizable functional group of the liquid crystal compound to be used in the present invention, but is generally 210 to 380 nm, and preferably 250 to 380 nm. A vacuum UV region of 100 to 200 nm of the light source is preferably cut through a filter or the like for suppressing a photodecomposition reaction of the liquid crystal compound. A wavelength within the above ranges allows sufficient curing of the liquid crystalline composition through a crosslinking reaction, and fixing of an alignment of the liquid crystalline composition.

An amount of UV irradiation is preferably 100 to 1,500 mJ/cm$^2$, and more preferably 100 to 800 mJ/cm$^2$. An amount of UV irradiation within the above ranges allows sufficient curing of the liquid crystalline composition through a crosslinking reaction, and fixing of an alignment of the liquid crystalline composition on the substrate.

A temperature inside an irradiation device at the above-mentioned amount of UV irradiation (also referred to as irradiation temperature) is not particularly limited, but irradiation is preferably performed while the temperature is maintained equal to or lower than a liquid crystal phase-isotropic phase transition temperature (Ti) of the liquid crystalline composition to be used in the present invention. The irradiation temperature is preferably Ti−5° C. or lower, and more preferably Ti−10° C. or lower. To be specific, the irradiation temperature is preferably 15 to 90° C., and more preferably 15 to 60° C. An irradiation temperature within the above ranges allows formation of a highly uniform retardation film.

The liquid crystal phase-isotropic phase transition temperature (Ti) can be determined by: holding the liquid crystalline composition to be used in the present invention between two glass slides; placing the whole on a temperature controller "LK-600PM" (trade name, manufactured by Japan Hightech Corporation); observing the whole under heating with a polarization microscope where two polarizers are placed in a cross Nicol arrangement; and measuring a temperature at which a dark field appears instead of a light field.

A specific method of maintaining the irradiation temperature constant is not particularly limited, and may be appropriately selected from heating methods or temperature control methods using: an air-circulating thermostatic oven in which hot air or cool air circulates; a heater using microwaves, far infrared rays, or the like; a heated roller for temperature adjustment; a heat pipe roller; and a heated metal belt.

In the present invention, the substrate having the application solution applied thereon may be subjected to drying treatment before and/or after UV irradiation. A temperature in the drying treatment (drying temperature) is not particularly limited, but is preferably within a temperature range in which the liquid crystalline composition has a liquid crystal phase. Further, the drying temperature is preferably a glass transition temperature (Tg) of the substrate or lower. The drying temperature is preferably 50 to 130° C., and more preferably 80 to 100° C. A temperature within the above ranges allows formation of a highly uniform retardation film.

A time period for the drying treatment (drying time) is not particularly limited, but is preferably 1 to 20 minutes, more preferably 1 to 15 minutes, and most preferably 2 to 10 minutes for obtaining a retardation film with favorable optical uniformity.

The retardation film used for the positive C plate has a light transmittance of preferably 80% or more, more preferably 85% or more, and particularly preferably 90% or more measured by using light of a wavelength of 590 nm at 23° C. The positive C plate preferably has a similar light transmittance.

The retardation film used for the positive C plate has a thickness direction birefringence (nx−nz) of preferably −0.20 to −0.03, more preferably −0.15 to −0.05, and particularly preferably −0.12 to −0.05 determined by using light of a wavelength of 589 nm at 23° C. A thickness direction birefringence within the above ranges can provide a thin retardation film with little unevenness in in-plane retardation values.

The retardation film used for the positive C plate may have any appropriate thickness depending on the purpose or the laminate structure of the positive C plate. In a case where the positive C plate is formed of a single retardation film, the retardation film has a thickness equal to a total thickness of the positive C plate. Further, in a case where the positive C plate has a laminate structure, a thickness of each retardation film is set such that a total thickness of the retardation films is equal to a preferred total thickness of the positive C plate. The retardation films may each have an identical thickness or a different thickness. To be specific, the thickness of the retardation film is preferably 0.1 to 100 μm, more preferably 0.1 to 80 μm, and particularly preferably 0.1 to 50 μm. A thickness of the retardation film within the above ranges can provide a retardation film with excellent mechanical strength and display uniformity.

F. Isotropic Optical Element

Referring to FIGS. 1, 2A, and 2B, the isotropic optical element 50 is arranged between the liquid crystal cell 10 and the second polarizer 20'. In this way, the isotropic optical element serves as a protective layer on a liquid crystal cell side of the polarizer and prevents deterioration of the polarizer, to thereby maintain high display properties of the liquid crystal panel for a long period of time.

In the specification of the present invention, the term "isotropic optical element" refers to an optical element satisfying a refractive index profile of nx=ny=nz (where, nx and ny represent main in-plane refractive indices and nz represents a thickness direction refractive index). The specification of the present invention includes not only a case where nx, ny, and nz are exactly equal, but also a case where nx, ny, and nz are substantially equal. The phrase "a case where nx, ny, and nz are substantially equal" as used herein includes a case where an in-plane retardation value (Re[590]) is 10 nm or less and a thickness direction retardation value (Rth[590]) is 10 nm or less, for example.

F-1. Optical Properties of Isotropic Optical Element

Re[590] of the isotropic optical element used in the present invention is preferably as small as possible for increasing contrast ratios in a normal direction and an oblique direction of the liquid crystal display apparatus. Re[590] is preferably 5 nm or less, and most preferably 3 nm or less.

Rth[590] of the isotropic optical element is preferably as small as possible for increasing a contrast ratio in an oblique direction of the liquid crystal display apparatus. Rth[590] is preferably 7 nm or less, and most preferably 5 nm or less. Rth[590] within the above ranges can eliminate adverse effects of Rth on display properties of the liquid crystal display apparatus.

F-2. Means for Arranging Isotropic Optical Element

Referring to FIGS. 2A and 2B, any appropriate method may be employed as a method of arranging the isotropic optical element 50 between the liquid crystal cell 10 and the second polarizer 20' depending on the purpose. The isotropic optical element 50 is preferably bonded to the liquid crystal cell 10 and the second polarizer 20' by providing an adhesive layer or pressure sensitive adhesive layer (not shown) on each side of the isotropic optical element 50. In this way, contrast of a liquid crystal display apparatus employing the isotropic optical element 50 can be increased.

A thickness of the adhesive layer or pressure sensitive adhesive layer may be appropriately determined in accordance with intended use, adhesive strength, and the like, and is generally 1 to 500 μm, preferably 5 to 200 μm, and particularly preferably 10 to 100 μm.

Any appropriate adhesive or pressure sensitive adhesive may be employed for forming the adhesive layer or pressure sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, in a case where one adherend is a substrate (typically, glass substrate) used for the liquid crystal cell, a pressure sensitive adhesive is preferably used because when axis shift occurs during attaching of the polarizer, the polarizer may be peeled off (also referred to as reworked) for reusing the liquid crystal cell. An acrylic pressure sensitive adhesive containing an acrylic polymer as a base polymer is preferably used as a pressure sensitive adhesive used for attaching the isotropic optical element 50 to the surface of the liquid crystal cell 10 from the view points of excellent optical transparency, appropriate pressure sensitive adhesive properties such as wetting property, agglomeration property, and adhesiveness, and excellent weatherability and thermal resistance. A specific example thereof includes a double-face optical tape "SK-2057" (trade name, available from Soken Chemical & Engineering Co., Ltd.) containing an acrylic pressure sensitive adhesive as a pressure sensitive adhesive layer.

In a case where nx and ny of the isotropic optical element 50 are exactly equal, the isotropic optical element 50 exhibits no in-plane birefringence and its slow axis is not detected. Thus, the isotropic optical element 50 may be arranged independently from the absorption axis of the second polarizer 20'. In a case where nx and ny of the isotropic optical element 50 are substantially equal but are slightly different, its slow axis may be detected. In this case, the isotropic optical element 50 is preferably arranged such that its slow axis is substantially parallel or perpendicular to the absorption axis of the second polarizer 20'. In the specification of the present invention, the phrase "substantially parallel" includes a case where the slow axis of the isotropic optical element 50 and the absorption axis of the second polarizer 20' form an angle of 0°±2.0°, preferably 0°±1.0°, and more preferably 0°±0.5°. The phrase "substantially perpendicular" includes a case where the slow axis of the isotropic optical element 50 and the absorption axis of the second polarizer 20' form an angle of 90°±2.0°, preferably 90°±1.0°, and more preferably 90°±0.5°. An angle greatly departing from the above ranges tends to cause reduction in contrast of a liquid crystal display apparatus employing the isotropic optical element 50.

F-3. Structure of Isotropic Optical Element

A structure (laminate structure) of the isotropic optical element is not particularly limited as long as the optical properties as described in the above section F-1 are satisfied. To be specific, the isotropic optical element may be a single optical film, or a laminate of two or more optical films. The isotropic optical element as a laminate may include an adhesive layer or a pressure sensitive adhesive layer for attaching the optical films. The optical film may be an isotropic film or a retardation film as long as the isotropic optical element has substantially optical isotropy. In a case where the isotropic optical element as a laminate includes two retardation films, the retardation films are preferably arranged such that the respective slow axes are perpendicular to each other, to thereby reduce in-plane retardation values. Further, the retardation films having opposite signs of thickness direction retardation values are preferably laminated, to thereby reduce thickness direction retardation values.

A total thickness of the isotropic optical element is preferably 10 to 200 μm, more preferably 15 to 150 μm, and particularly preferably 20 to 100 μm. A thickness within the above ranges can provide an isotropic optical element with excellent optical uniformity.

F-4. Optical Film Used for Isotropic Optical Element

The optical film used for the isotropic optical element is preferably an isotropic film. In the specification of the present invention, the term "isotropic film" refers to a film having a small difference in optical properties in three-dimensional directions and having substantially no anisotropic optical properties such as birefringence. Note that the phrase "having substantially no anisotropic optical properties" indicates that isotropy includes a case where slight birefringence provides no adverse effects on display properties of a liquid crystal display apparatus in practical use.

Any appropriate method may be employed as a method of obtaining the isotropic film. Specific examples thereof include extrusion, solvent casting, and inflation. Extrusion is preferably used for forming an isotropic film.

Examples of a material forming the isotropic film include: general purpose plastics such as polyethylene, polypropylene, polynorbornene, polyvinyl chloride, a cellulose ester, polystyrene, an ABS resin, an AS resin, polymethylmethacrylate, polyvinyl acetate, and polyvinylidene chloride; general purpose engineering plastics such as polyamide, polyacetal, polycarbonate, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystal polymer, polyamideimide, polyimide, and polytetrafluoroethylene. The isotropic film may be used after appropriate polymer modification. Examples of the polymer modification include copolymerization, branching, crosslinking, and modifications in molecular terminals and stereoregularity. Two or more kinds of isotropic films may be used in combination.

The material forming the isotropic film to be used is preferably a polymer film containing as a main component at least one resin selected from polynorbornene, a cellulose ester, an isobutylene/N-methylmaleimide copolymer, and an acrylonitrile/styrene copolymer from the viewpoints of excellent transparency, mechanical strength, thermal stability, and water barrier property, small absolute value of photoelastic coefficient, and excellent adhesiveness with the polarizer.

Polynorbornene obtained through addition copolymerization of ethylene and a norbornene-based monomer is particularly preferably used from the viewpoints of particularly small absolute value of photoelastic coefficient and hardly developing retardation values. Polynorbornene described in the section D-4 is particularly preferably used and polynorbornene containing a repeating unit represented by the following general formula (7) is most preferably used.

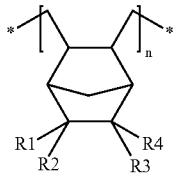

(7)

In the general formula (7): R1 to R4 each independently represent a group selected from hydrogen, a halogen, a halogenated alkyl group having 1 to 5 carbon atoms, an alkyl group having 1 to 5 carbon atoms, an alkoxy group having 1 to 5 carbon atoms, an alkoxycarbonyl group having 1 to 5 carbon atoms, an alkylcarbonyloxy group having 1 to 5 carbon atoms, and substituted derivatives thereof; and n represents an integer of 1 or more. Most preferably, R1 to R4 each represent a hydrogen atom.

The isotropic film used for the isotropic optical element has a light transmittance of preferably 80% or more, more preferably 85% or more, and particularly preferably 90% or more measured by using light of a wavelength of 590 nm at 23° C. The isotropic optical element preferably has a similar light transmittance.

An absolute value of photoelastic coefficient C[590] (m²/N) of the isotropic film is preferably $2.0 \times 10^{-13}$ to $1.0 \times 10^{-10}$, more preferably $1.0 \times 10^{-12}$ to $1.0 \times 10^{-10}$, and particularly preferably $1.0 \times 10^{-12}$ to $2.0 \times 10^{-11}$. An absolute value of photoelastic coefficient within the above ranges can provide a liquid crystal display apparatus with excellent display uniformity.

The isotropic film may have any appropriate thickness depending on the purpose or the laminate structure of the isotropic optical element. In a case where the isotropic optical element is formed of a single isotropic film, the isotropic film has a thickness equal to a total thickness of the isotropic optical element. Further, in a case where the isotropic optical element has a laminate structure, a thickness of each isotropic film is set such that a total thickness of the isotropic films is equal to a preferred total thickness of the isotropic optical element. The isotropic films may each have an identical thickness or a different thickness. To be specific, the thickness of the isotropic film is preferably 10 to 100 μm, more preferably 10 to 80 μm, and particularly preferably 10 to 50 μm. A thickness within the above ranges can provide an isotropic film with excellent mechanical strength and display uniformity.

G. Liquid Crystal Display Apparatus

The liquid crystal panel of the present invention may be used for: a liquid crystal display apparatus such as a personal computer, a liquid crystal television, a cellular phone, or a personal digital assistance (PDA); or an image display apparatus such as an organic electroluminescence display (organic EL), a projector, a projection television, or a plasma television. In particular, the liquid crystal panel of the present invention is preferably used for a liquid crystal display apparatus, and particularly preferably used for a liquid crystal television.

Figure 3:
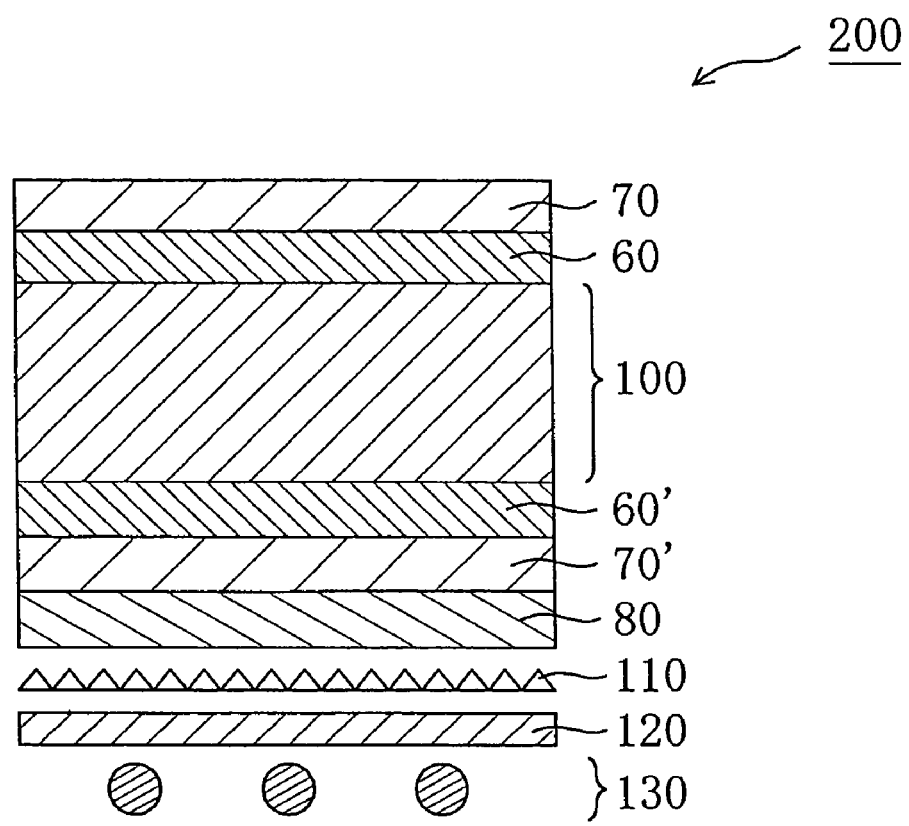
FIG. 3 is a schematic sectional view of a liquid crystal display apparatus according to a preferred embodiment of the present invention.

FIG. 3 is a schematic sectional view of a liquid crystal display apparatus according to a preferred embodiment of the present invention. A liquid crystal display apparatus 200 is provided with: a liquid crystal panel 100; protective layers 60 and 60' arranged on both sides of the liquid crystal panel; surface treated layers 70 and 70' arranged on outer sides of the protective layers 60 and 60'; a brightness enhancement film 80 arranged on an outer side (backlight side) of the surface treated layer 70'; a prism sheet 110; a light guide plate 120; and backlight 130. Treated layers subjected to hard coat treatment, antireflection treatment, anti-sticking treatment, diffusion treatment (also referred to as anti-glare treatment), or the like is used as the surface treated layers 70 and 70'. A polarization separation film having a polarization selection layer "D-BEF series" (trade name, available from Sumitomo 3M Limited, for example) or the like is used as the brightness enhancement film 80. The above-described optical members are used, to thereby obtain a display apparatus with better display properties. According to another embodiment, the optical members shown in FIG. 3 may be partly omitted or replaced by other members in accordance with the drive mode or application of the liquid crystal cell to be used as long as the effects of the present invention are obtained.

The liquid crystal display apparatus provided with the liquid crystal panel of the present invention has a contrast ratio (YW/YB) of preferably 10 to 200, more preferably 15 to 200, and particularly preferably 40 to 200 at an azimuth angle of 45° and a polar angle of 60°.

The liquid crystal display apparatus provided with the liquid crystal panel of the present invention has a color shift (Δab value) of preferably 0.05 to 1.3, more preferably 0.05 to 0.9, and particularly preferably 0.05 to 0.6 at an azimuth angle of 45° and a polar angle of 60°.

H. Application of Liquid Crystal Panel of the Present Invention

The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

In particular, the liquid crystal panel and liquid crystal display apparatus of the present invention are preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. However, the present invention is not limited to the examples. Analysis methods used in the examples are described below.

(1) Method of Determining Single Axis Transmittance and Degree of Polarization:

The single axis transmittance and degree of polarization were determined at 23° C. by using a spectrophotometer "DOT-3" (trade name, manufactured by Murakami Color Research Laboratory).

(2) Method of Determining Molecular Weight:

The molecular weight was calculated through gel permeation chromatography (GPC) by using polystyrene as a standard sample. To be specific, the molecular weight was determined under the following measurement conditions by using the following apparatus and instruments.

Analyzer: "HLC-8120GPC", manufactured by Tosoh Corporation
Column: TSKgel SuperHM-H/H4000/H3000/H2000
Column size: 6.0 mmI.D.×150 mm
Eluant: tetrahydrofuran
Flow rate: 0.6 ml/minute
Detector: RI
Column temperature: 40° C.
Injection amount: 20 μl (3) Method of Measuring Thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Determining Retardation Values (Re, Rth):

The retardation values were determined by using an automatic birefringence analyzer "KOBRA-21ADH" (trade name, manufactured by Oji Scientific Instruments) based on a parallel Nicol rotation method by using light of a wavelength of 590 nm at 23° C. Light of a wavelength of 480 nm was also used for wavelength dispersion measurement.

(5) Method of Measuring Refractive Index of Film:

The refractive index of the film was determined by measuring refractive indices by using an Abbe refractometer "DR-M4" (trade name, manufactured by Atago Co., Ltd.) by using light of a wavelength of 589 nm at 23° C.

(6) Method of Measuring Transmittance:

The transmittance was measured by using a UV-vis spectrophotometer "V-560" (trade name, manufactured by JASCO Corporation) by using light of a wavelength of 590 nm at 23° C.

(7) Method of Determining Photoelastic Coefficient:

The retardation values (23° C./wavelength of 590 nm) at a center of a sample having a size of 2 cm×10 cm were determined under stress (5 to 15 N) by using a spectroscopic ellipsometer "M-220" (trade name, manufactured by JASCO Corporation) while both ends of the sample were held, and the photoelastic coefficient was calculated from a slope of a function of the stress and the retardation values.

(8) Method of Determining Contrast Ratio of Liquid Crystal Display Apparatus:

Measurement was performed in a dark room at 23° C. by using the following method, liquid crystal cell, and measurement apparatus. A white image and a black image were displayed on a liquid crystal display apparatus, and Y values of an XYZ display system at an azimuth angle of 45° and polar angle of 60° of a display screen were measured by using "EZ Contrast 160D" (trade name, manufactured by ELDIM SA). A contrast ratio "YW/YB" in an oblique direction was calculated from a Y value (YW) of the white image and a Y value (YB) of the black image. Note that, the azimuth angle of 45° refers to a direction rotated by 45° in a counter clockwise direction with respect to a longer side of the panel at 0°. The polar angle of 60° refers to a direction inclined by 60° with respect to a normal direction of the display screen at 0°.

Liquid crystal cell: liquid crystal cell installed in "KLV-17HR2" (trade name, manufactured by Sony Corporation)
Panel size: 375 mm×230 mm (9) Method of Determining Color Shift of Liquid Crystal Display Apparatus:

A black image was displayed on the liquid crystal display apparatus, and color tones (a value and b value) were measured in all azimuth directions (0° to 360°) at a polar angle of 60° by using "EZ Contrast 160D" (trade name, manufactured by ELDIM SA). Average values of the a values and the b values in all azimuth directions (0 to 360°) at a polar angle of 60° were respectively represented by an $a_{ave.}$ value and a $b_{ave.}$ value, and an a value and a b value at an azimuth angle of 45° and a polar angle of 60° were respectively represented by an $a_{45}°$ value and a $b_{45}°$ value. The color shift (Δab value) in an oblique direction was calculated from the following expression: $\{(a_{45°}-a_{ave.})^2+(b_{45°}-b_{ave.})^2\}^{1/2}$. Note that, the azimuth angle of 45° refers to a direction rotated by 45° in a counter clockwise direction with respect to a longer side of the panel at 0°. The polar angle of 60° refers to a direction viewed from 60° with respect to a normal direction of the panel at 0°.

Production of Positive A Plate

REFERENCE EXAMPLE 1

A commercially available polymer film "ARTON G" (trade name, thickness of 100 μm, glass transition temperature of 171° C., weight average molecular weight of 130,000, available from JSR Corporation) containing a polynorbornene as a main component was longitudinally uniaxially stretched 1.30 times in an air-circulating thermostatic oven at 175° C. (temperature measured at a distance of 3 cm from a back surface of the film, temperature fluctuation of ±1° C.) by using a roll stretching machine while a longitudinal direction of the film was held, to thereby produce a retardation film A. Table 1 shows properties of the obtained retardation film A. The polymer film (before stretching) had Re[590] of 3 nm and Rth[590] of 7 nm.

REFERENCE EXAMPLE 2

A commercially available polymer film "Pureace WR" (trade name, thickness of 78 μm, available from Teijin Ltd.) containing a polycarbonate as a main component and having a fluorene structure in a molecular structure was used as a retardation film B. Table 1 shows the properties of the retardation film B.

REFERENCE EXAMPLE 3

A retardation film C was produced in the same manner as in Reference Example 1 except that the stretch ratio was changed from 1.30 times to 1.38 times. Table 1 shows the properties of the obtained retardation film C.

Production of Positive C Plate

REFERENCE EXAMPLE 4

An ethyl silicate solution (2 wt % mixed solution of ethyl acetate and isopropyl alcohol, available from COLCOAT Co., Ltd.) was applied on a commercially available polyethylene terephthalate film "S-27E" (trade name, thickness of 75 μm, available from Toray Industries, Inc.) by using a gravure coater, and the whole was dried in an air-circulating thermostatic oven at 130° C. (temperature fluctuation of ±1° C.) for 1 minute, to thereby produce a polyethylene terephthalate film having a glass polymer film (thickness of 0.1 μm).

5 parts by weight of a liquid crystal polymer (weight average molecular weight of 5,000) represented by the following formula (8), 20 parts by weight of a commercially available liquid crystal compound "Paliocolor LC242" (trade name, available from BASF Aktiengesellschaft) having a phenylbenzoate group as a mesogenic group and having two polymerizable functional groups in a molecular structure, and 1.25 parts by weight of a photopolymerization initiator "IRGACURE 907" (tradename, available from Ciba Specialty Chemicals) were mixed, to thereby prepare a liquid crystalline composition. The liquid crystalline composition was dissolved in 75 parts by weight of cyclohexanone, to thereby prepare an application solution. The application solution was applied on the glass polymer film of the polyethylene terephthalate film by using a rod coater, and the whole was dried in an air-circulating thermostatic oven at 80° C. (temperature fluctuation of ±1° C.) for 2 minutes and then cooled to room temperature (23° C.), to thereby form a hardened layer of a homeotropically aligned liquid crystalline composition on the substrate. The thus-formed layer was irradiated with UV light of 400 mJ/cm² (by using an irradiation device with a metal halide lamp as a light source, measured at a wavelength of 365 nm) in an air atmosphere from on a side having the application solution applied thereon, to thereby form a cured layer of the homeotropically aligned liquid crystalline composition on the substrate. The substrate was peeled off, to thereby produce a retardation film D. Table 1 shows the properties of the retardation film D.

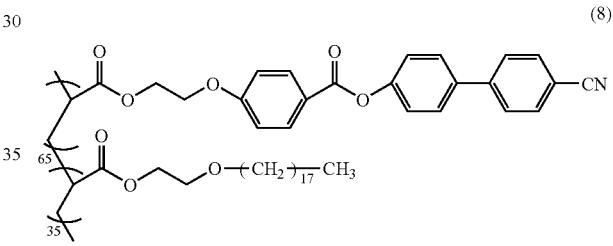

(8)

REFERENCE EXAMPLE 5

A retardation film E was produced in the same manner as in Reference Example 4 except that the application thickness of the application solution was changed. Table 1 shows the properties of the retardation film E.

REFERENCE EXAMPLE 6

A retardation film F was produced in the same manner as in Reference Example 4 except that the application thickness of the application solution was changed. Table 1 shows the properties of the retardation film F.

TABLE 1

| | Reference Example 1 | Reference Example 2 | Reference Example 3 | Reference Example 4 | Reference Example 5 | Reference Example 6 |
|---|---|---|---|---|---|---|
| Retardation film | A | B | C | D | E | F |
| Thickness (μm) | 80 | 78 | 73 | 0.75 | 1.0 | 1.5 |
| Transmittance (%) | 91 | 91 | 91 | 92 | 91 | 91 |
| Re[590](nm) | 100 | 140 | 160 | 0.1 | 0.1 | 0.1 |
| Rth[590](nm) | 102 | 138 | 160 | −75 | −100 | −150 |
| Re[480]/Re[590] | 1.00 | 0.86 | 1.00 | Not determined | Not determined | Not determined |
| C[590] × 10⁻¹² (m²/N) | 5.0 | 57.5 | 5.0 | Not determined | Not determined | Not determined |

Production of Isotropic Optical Element

REFERENCE EXAMPLE 7

Pellets of polynorbornene "TOPAS" (trade name, glass transition temperature of 140° C., weight average molecular weight of 90,000, available from Ticona) obtained through addition copolymerization of ethylene and norbornene were dried at 100° C. for 5 hours. Then, the resultant was extruded at 270° C. by using a single-screw extruder of 40 nmφ and a T-die of 400 mm width, and a sheet-like molten resin was cooled by using a cooling drum, to thereby produce a polymer film A having a width of about 600 mm and a thickness of 40 μm. Table 2 shows the properties of the polymer film A.

REFERENCE EXAMPLE 8

20 parts by weight of polynorbornene "ARTON G" (trade name, available from JSR Corporation) was dissolved in 80 parts by weight of cyclopentanone (solvent), to thereby prepare a solution. The solution was applied on a commercially available cellulose ester film "UZ-TAC" (trade name, thickness of 40 μm, available from Fuji Photo Film Co., Ltd.) to an application thickness of 150 μm, so as to swell the cellulose ester film. The resultant was dried in an air-circulating thermostatic oven at 140° C. (temperature fluctuation of ±1° C.) for 3 minutes to evaporate the solvent, to thereby form a polynorbornene layer on a surface of the cellulose ester film. The polynorbornene layer was peeled off, to thereby obtain a transparent cellulose ester film as a polymer film B. Table 2 shows the properties of the polymer film B. The cellulose ester film before swelling had Re[590] of 2.2 nm and Rth[590] of 39.8 nm.

REFERENCE EXAMPLE 9

65 parts by weight of an alternating copolymer of isobutylene and N-methylmaleimide (N-methylmaleimide content of 50 mol % and glass transition temperature of 157° C.), 35 parts by weight of an acrylonitrile/styrene copolymer (acrylonitrile content of 27 mol %), and 1 part by weight of 2-[4, 6-diphenyl-1,3,5-triazin-2-yl]-5-[(hexyl)oxy]-phenol (UV absorber) were formed into pellets by using an extruder. Then, the resultant was dried at 100° C. for 5 hours and extruded at 270° C. by using a single-screw extruder of 40 nmΦ and a T-die of 400 mm width, and a sheet-like molten resin was cooled by using a cooling drum, to thereby produce a polymer film C having a width of about 600 mm and a thickness of 40 μm. Table 2 shows the properties of the polymer film C.

REFERENCE EXAMPLE 10

A commercially available cellulose ester film "UZ-TAC" (trade name, thickness of 80 μm, available from Fuji Photo Film Co., Ltd.) as it was used as a polymer film D. Table 2 shows the properties of the polymer film D.

TABLE 2

|  | Reference Example 7 | Reference Example 8 | Reference Example 9 | Reference Example 10 |
|---|---|---|---|---|
| Polymer film | A | B | C | D |
| Thickness(μm) | 40 | 42 | 40 | 80 |
| Transmittance(%) | 91 | 90 | 91 | 91 |
| Re[590](nm) | 0.1 | 2.0 | 2.1 | 2.5 |
| Rth[590](nm) | 1.0 | 0.5 | 2.9 | 60.2 |
| C[590] × $10^{-12}$ (m²/N) | 4.8 | 17.8 | 5.1 | 14.0 |

Production of Polarizer

REFERENCE EXAMPLE 11

A polymer film "9P75R" (tradename, thickness of 75 μm, average degree of polymerization of 2,400, degree of saponification of 99.9 mol %, available from Kuraray Co., Ltd.) containing polyvinyl alcohol as a main component was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in an aqueous solution maintained at 60° C.±3° C. and containing boric acid and potassium iodide while a crosslinking reaction was performed. The obtained film was dried in an air circulating thermostatic oven at 50° C.±1° C. for 30 minutes, to thereby obtain polarizers P1 and P2 each having a moisture content of 26%, a thickness of 28 μm, a degree of polarization of 99.9%, and a single axis transmittance of 43.5%.

EXAMPLE 1

A liquid crystal panel was removed from a commercially available liquid crystal display apparatus "KLV-17HR2" (manufactured by Sony Corporation) provided with a liquid crystal cell of IPS mode. Polarizing plates arranged above and below the liquid crystal cell were removed, and glass surfaces (front and back surfaces) of the liquid crystal cell were washed. Then, the retardation film E produced in Reference Example 5 as a positive C plate was attached to the surface on a viewer side of the liquid crystal cell such that a slow axis of the retardation film E was parallel (0°±0.2°) to a longer side of the liquid crystal cell by using an acrylic pressure-sensitive adhesive layer (thickness of 20 μm). Next, the retardation film B produced in Reference Example 2 as a positive A plate was attached to the surface of the retardation film E such that a slow axis of the retardation film B was perpendicular (90°±0.2°) to the longer side of the liquid crystal cell by using an acrylic pressure-sensitive adhesive layer (thickness of 10 μm) Further, the polarizer P1 produced in Reference Example 11 as a first polarizer was attached to the surface of the retardation film B such that an absorption axis of the polarizer P1 was parallel (0°±0.2°) to the longer side of the liquid crystal cell by using an acrylic pressure-sensitive adhesive layer (thickness of 10 μm) In this case, the slow axis of the retardation film B and the absorption axis of the polarizer P1 were perpendicular (90°±0.4°) to each other.

Next, the polymer film A produced in Reference Example 7 as an isotropic optical element was attached to the surface on a backlight side of the liquid crystal cell such that a slow axis of the polymer film A was parallel (0°±0.2°) to a shorter side of the liquid crystal cell by using an acrylic pressure-sensitive adhesive layer (thickness of 10 μm). Then, the polarizer P2 produced in Reference Example 11 as a second polarizer was attached to the surface of the polymer film A such that an absorption axis of the polarizer 2 was parallel (0°±0.2°) to the shorter side of the liquid crystal cell by using an acrylic pressure-sensitive adhesive layer (thickness of 10 μm). In this case, the absorption axis of the polarizer P1 and the absorption axis of the polarizer P2 were perpendicular (90°±0.4°) to each other.

The thus-produced liquid crystal panel is a liquid crystal panel of O-mode having a structure similar to that of FIG. 2A. The liquid crystal panel was incorporated into the original liquid crystal display apparatus, and backlight was turned on for 10 minutes, to thereby determine a contrast ratio in an oblique direction and a color shift in an oblique direction. Table 3 shows the obtained properties.

EXAMPLE 2

A liquid crystal panel was produced in the same manner as in Example 1 except that the retardation film A was used as the positive A plate instead of the retardation film B, to thereby determine a contrast ratio in an oblique direction and a color shift in an oblique direction. Table 3 shows the obtained properties.

EXAMPLE 3

A liquid crystal panel was produced in the same manner as in Example 1 except that the retardation film C was used as the positive A plate instead of the retardation film B, to thereby determine a contrast ratio in an oblique direction and a color shift in an oblique direction. Table 3 shows the obtained properties.

EXAMPLE 4

A liquid crystal panel was produced in the same manner as in Example 1 except that the retardation film D was used as the positive C plate instead of the retardation film E, to thereby determine a contrast ratio in an oblique direction and a color shift in an oblique direction. Table 3 shows the obtained properties.

EXAMPLE 5

A liquid crystal panel was produced in the same manner as in Example 1 except that the retardation film F was used as the positive C plate instead of the retardation film E, to thereby determine a contrast ratio in an oblique direction and a color shift in an oblique direction. Table 3 shows the obtained properties.

EXAMPLE 6

A liquid crystal panel was produced in the same manner as in Example 1 except that the polymer film C was used as the isotropic optical element instead of the polymer film A, to thereby determine a contrast ratio in an oblique direction and a color shift in an oblique direction. Table 3 shows the obtained properties.

COMPARATIVE EXAMPLE 1

A liquid crystal panel was produced in the same manner as in Example 1 except that the polymer film D produced in Reference Example 10 was used as the isotropic optical element instead of the polymer film A, to thereby determine a contrast ratio in an oblique direction and a color shift in an oblique direction. Table 3 shows the obtained properties.

COMPARATIVE EXAMPLE 2

A liquid crystal panel was removed from a commercially available liquid crystal display apparatus "KLV-17HR2" (manufactured by Sony Corporation) provided with a liquid crystal cell of IPS mode in the same manner as in Example 1. Polarizing plates arranged above and below the liquid crystal cell were removed, and glass surfaces (front and back surfaces) of the liquid crystal cell were washed. Then, the polarizer P1 produced in Reference Example 11 as a first polarizer was attached to the surface on a viewer side of the liquid crystal cell such that the absorption axis of the polarizer P1 was parallel (0°±0.2°) to the longer side of the liquid crystal cell by using an acrylic pressure-sensitive adhesive layer (thickness of 10 μm). In other words, either the positive A plate or the positive C plate was not used.

Next, the polymer film A produced in Reference Example 7 as an isotropic optical element was attached to the surface on a backlight side of the liquid crystal cell such that the slow axis of the polymer film A was parallel (0°±0.2°) to the shorter side of the liquid crystal cell by using an acrylic pressure-sensitive adhesive layer (thickness of 10 μm). Then, the polarizer P2 produced in Reference Example 11 as a second polarizer was attached to the surface of the polymer film A such that the absorption axis of the polarizer P2 was parallel (0°±0.2°) to the shorter side of the liquid crystal cell by using an acrylic pressure-sensitive adhesive layer (thickness of 10 μm). In this case, the absorption axis of the polarizer P1 and the absorption axis of the polarizer P2 were perpendicular (90°±0.4°) to each other.

A contrast ratio in an oblique direction and a color shift in an oblique direction of a liquid crystal display apparatus provided with the thus-obtained liquid crystal panel were determined in the same manner as in Example 1. Table 3 shows the obtained properties.

COMPARATIVE EXAMPLE 3

A liquid crystal panel was produced in the same manner as in Example 1 except that the order for attaching the retardation film E and the retardation film B to the surface on a viewer side of the liquid crystal cell in Example 1 was reversed (that is, the retardation film B was arranged between the liquid crystal cell and the retardation film E), to thereby determine a contrast ratio in an oblique direction and a color shift in an oblique direction. Table 3 shows the obtained properties.

TABLE 3

|  | Positive A plate | | Positive C plate | | Isotropic optical element | Liquid crystal panel | |
|---|---|---|---|---|---|---|---|
|  |  |  |  |  |  | Contrast ratio in | Color shift in |
|  | Retardation film | Re[590] (nm) | Retardation film | Rth[590] (nm) | Polymer film | oblique direction | oblique direction |
| Example 1 | B | 140 | E | −100 | A | 71.0 | 0.23 |
| Example 2 | A | 100 | E | −100 | A | 21.8 | 0.35 |
| Example 3 | C | 160 | E | −100 | A | 29.8 | 0.58 |
| Example 4 | B | 140 | D | −75 | A | 52.8 | 0.83 |
| Example 5 | B | 140 | F | −150 | A | 16.9 | 1.29 |
| Example 6 | B | 140 | E | −100 | C | 69.3 | 0.25 |
| Comparative Example 1 | B | 140 | E | −100 | D | 5.3 | 2.5 |
| Comparative Example 2 | Not used | | Not used | | A | 7.4 | 1.4 |
| Comparative Example 3 | B | 140 | E | −100 | A | 3.1 | 6.1 |

Evaluation

As shown in each of Examples 1 to 6, the liquid crystal panel having the positive A plate, the positive C plate, and the isotropic optical element arranged as shown in FIGS. 2A and 2B provided a liquid crystal display apparatus with a large contrast ratio in an oblique direction and a small color shift in an oblique direction. The results of Examples 1 to 3 indicate that the positive A plate most preferably has Re[590] of about 140 nm. Further, the results of Examples 1, 4, and 5 indicate that the positive C plate most preferably has Rth[590] of about −100 nm. Meanwhile, Comparative Example 1 provided a liquid crystal panel employing the polymer film D as the isotropic optical element, which was hitherto used as a protective layer of a polarizer, instead of the polymer film A. This liquid crystal panel provided only a liquid crystal display apparatus with a small contrast ratio in an oblique direction and a large color shift in an oblique direction. The liquid crystal panel of Comparative Example 2 employing no positive A plate and no positive C plate similarly provided only a liquid crystal display apparatus with a small contrast ratio in an oblique direction and a large color shift in an oblique direction. The liquid crystal panel of Comparative Example 3 had the positive A plate and the positive C plate arranged in the reverse order of that of the liquid crystal panel of Example 1, and provided only a liquid crystal display apparatus with a small contrast ratio in an oblique direction and a large color shift in an oblique direction.

As described above, the liquid crystal panel of the present invention is capable of increasing a contrast ratio in an oblique direction and reducing a color shift in an oblique direction, and is thus very useful for improving display properties of the liquid crystal display apparatus. Therefore, the liquid crystal panel of the present invention may suitably be used for a liquid crystal display apparatus or a liquid crystal television.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel comprising:
   a liquid crystal cell;
   a first polarizer arranged on one side of the liquid crystal cell;
   a second polarizer arranged on another side of the liquid crystal cell;
   a positive A plate and a positive C plate arranged between the liquid crystal cell and the first polarizer; and
   an isotropic optical element arranged between the liquid crystal cell and the second polarizer,
   wherein the positive A plate is arranged between the first polarizer and the positive C plate, and
   wherein the positive A plate has an in-plane retardation value (Re[590]) of 70 to 200 nm determined by using light of a wavelength of 590 nm at 23° C.

2. A liquid crystal panel according to claim 1, wherein the liquid crystal cell comprises a liquid crystal layer containing homogeneously aligned liquid crystal molecules in the absence of an electric field.

3. A liquid crystal panel according to claim 2, wherein the liquid crystal layer has a refractive index profile of nx>ny=nz.

4. A liquid crystal panel according to claim 3, wherein the liquid crystal cell comprises one of IPS mode, FFS mode, and FLC mode.

5. A liquid crystal panel according to claim 1, wherein an initial alignment direction of the liquid crystal cell is substantially parallel to a direction of an absorption axis of the second polarizer.

6. A liquid crystal panel according to claim 5, wherein the initial alignment direction of the liquid crystal cell is substantially parallel to a direction of an absorption axis of the polarizer arranged on a backlight side of the liquid crystal cell.

7. A liquid crystal panel according to claim 5, wherein the initial alignment direction of the liquid crystal cell is substantially perpendicular to a direction of an absorption axis of the polarizer arranged on a backlight side of the liquid crystal cell.

8. A liquid crystal panel according to claim 1, wherein a slow axis of the positive A plate is substantially perpendicular to an absorption axis of the first polarizer.

9. A liquid crystal panel according to claim 1, wherein the positive A plate has an absolute value of difference between Re[590] and Rth[590], that is, |Rth[590]−Re[590]| of 0 to 5 nm.

10. A liquid crystal panel according to claim 1, wherein the positive A plate has Re[480]/Re[590] of 0.8 to 1.2.

11. A liquid crystal panel according to claim 1, wherein the positive A plate comprises a stretched film of a polymer film containing one of polynorbonene and polycarbonate as a main component.

12. A liquid crystal panel according to claim 11, wherein the polymer film has an absolute value of photoelastic coefficient C[590] (m$^2$/N) of $2.0 \times 10^{-13}$ to $1.0 \times 10^{-10}$.

13. A liquid crystal panel according to claim 1, wherein the positive C plate has a thickness direction retardation value (Rth[590]) of −200 to −30 nm determined by using light of a wavelength of 590 nm at 23° C.

14. A liquid crystal panel according to claim 13, wherein the positive C plate has Re[590] of 0 to 5 nm.

15. A liquid crystal panel according to claim 1, wherein the positive C plate comprises one of a hardened layer and a cured layer of a homeotropically aligned liquid crystalline composition.

16. A liquid crystal panel according to claim 1, wherein the isotropic optical element comprises a polymer film containing as a main component at least one resin selected from the group consisting of polynorbornene, a cellulose ester, an isobutylene/N-methylmaleimide copolymer, and an acrylonitrile/styrene copolymer.

17. A liquid crystal panel according to claim 16, wherein the polymer film has an absolute value of photoelastic coefficient C[590] (m$^2$/N) of $2.0 \times 10^{-13}$ to $1.0 \times 10^{-10}$.

18. A liquid crystal television comprising the liquid crystal panel according to claim 1.

19. A liquid crystal display apparatus comprising the liquid crystal panel according to claim 1.

* * * * *